(12) United States Patent
Abe et al.

(10) Patent No.: US 8,487,267 B2
(45) Date of Patent: Jul. 16, 2013

(54) ULTRAVIOLET IRRADIATION SYSTEM

(75) Inventors: Norimitsu Abe, Kanagawa-ken (JP);
Shinji Kobayashi, Kanagawa-ken (JP);
Takeshi Ide, Tokyo (JP); Naoto Yoshizawa, Tokyo (JP); Akihiko Shirota, Tokyo (JP); Takahiro Soma, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/422,521

(22) Filed: Mar. 16, 2012

(65) Prior Publication Data
US 2012/0235050 A1    Sep. 20, 2012

(30) Foreign Application Priority Data

Mar. 17, 2011    (JP) ................................ P2011-059931

(51) Int. Cl.
*C02F 1/32* (2006.01)
*G01N 23/12* (2006.01)

(52) U.S. Cl.
USPC .......................... 250/372; 250/435; 210/748.1

(58) Field of Classification Search
USPC ............. 210/748.01, 748.1, 748.11; 250/372, 250/373, 432 R, 435; 422/24
See application file for complete search history.

(56) References Cited

U.S. PATENT DOCUMENTS

| | | |
|---|---|---|
| 6,451,202 B1 | 9/2002 | Kuennen et al. |
| 2006/0219630 A1 | 10/2006 | Abe et al. |
| 2011/0150708 A1 | 6/2011 | Kobayashi et al. |

FOREIGN PATENT DOCUMENTS

| | | |
|---|---|---|
| EP | 1 130 381 A1 | 5/2001 |
| JP | 2002-263645 | 9/2002 |
| JP | 2005-52760 | 3/2005 |
| JP | 2005-279434 | 10/2005 |
| JP | 2005-334756 | 12/2005 |
| JP | 3881183 B2 | 2/2007 |
| JP | 4138797 B2 | 8/2008 |
| JP | 4168348 B2 | 10/2008 |

OTHER PUBLICATIONS

The Water Service Research and Development Center, "The ultraviolet irradiation device JWRC technology examination standard", (Moderate pressure ultraviolet rays lamp.), 2008, 51pages.
Norimitsu Abe, et al., "The comparison between irradiation performance analysis and inspection examination of the moderate pressure ultraviolet irradiation device", Official Journal of a scientific society "EICA", vol. 15, Second and third merger, 2010, 4 pages.
Office Action issued Sep. 17, 2012 in European Application No. 12159852.8-1213.

*Primary Examiner* — Mark R Gaworecki
(74) *Attorney, Agent, or Firm* — Oblon, Spivak, McClelland, Maier & Neustadt, L.L.P.

(57) ABSTRACT

An ultraviolet irradiation system includes: an ultraviolet irradiation apparatus including a plurality of ultraviolet lamps; a flowmeter configured to measure a flow rate of the water to be treated that passes through the ultraviolet irradiation apparatus; and an ultraviolet-dose monitoring and controlling apparatus configured to monitor an ultraviolet dose of the ultraviolet irradiation apparatus and to control outputs of the ultraviolet lamps. The plurality of ultraviolet lamps include a first ultraviolet lamp and a plurality of second ultraviolet lamps. The ultraviolet irradiation apparatus includes: a first measurement head configured to measure an ultraviolet intensity of the first ultraviolet lamp; and a plurality of second measurement heads configured to respectively measure ultraviolet intensities of the plurality of the ultraviolet lamps. A distance between the first ultraviolet lamp and the first measurement head is set to a determined value.

10 Claims, 24 Drawing Sheets

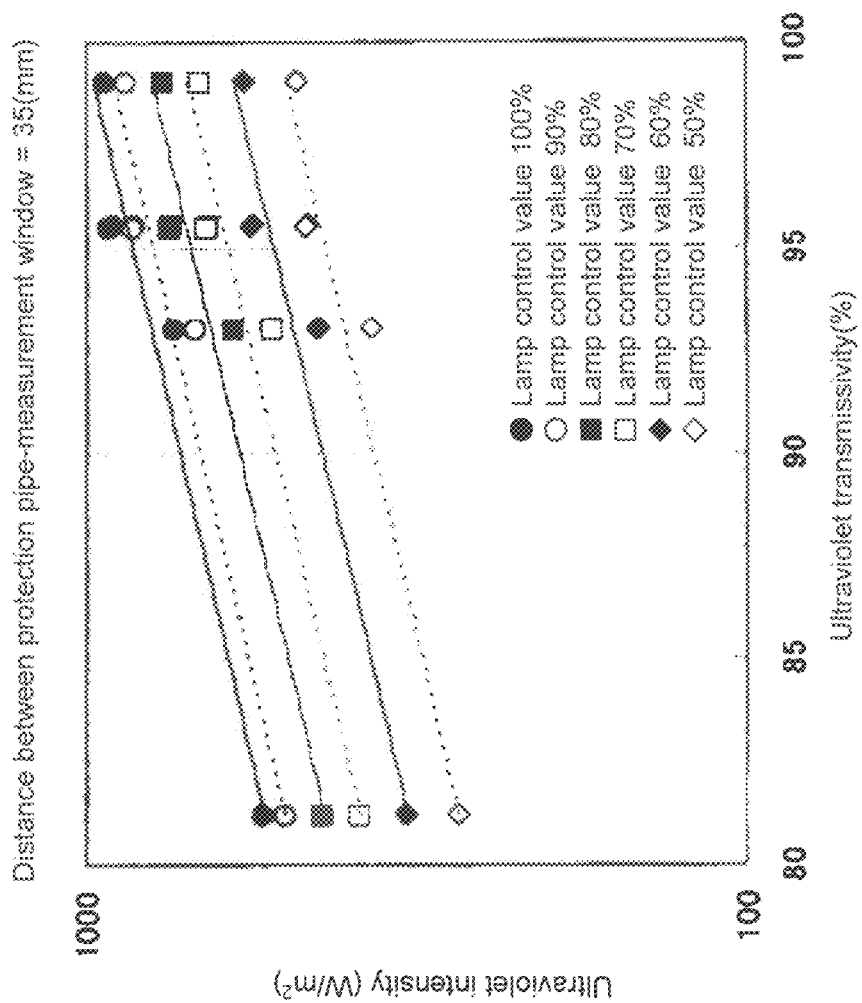
FIG. 6B1

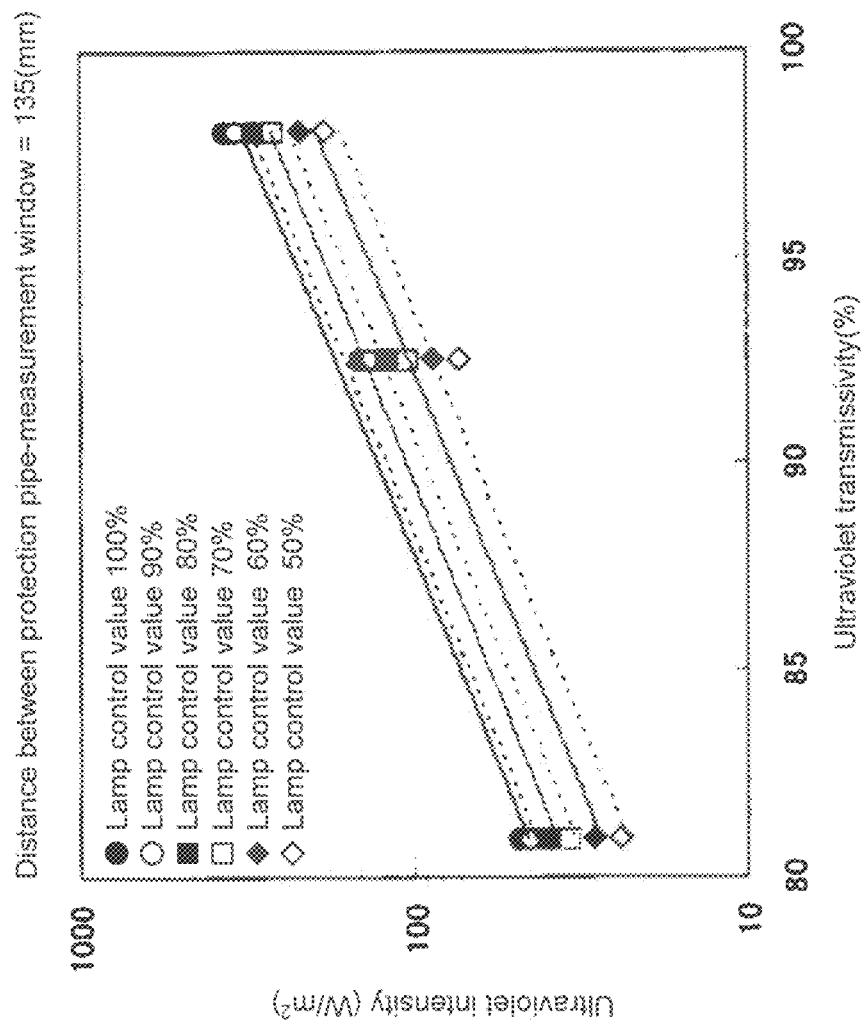
FIG. 6B2

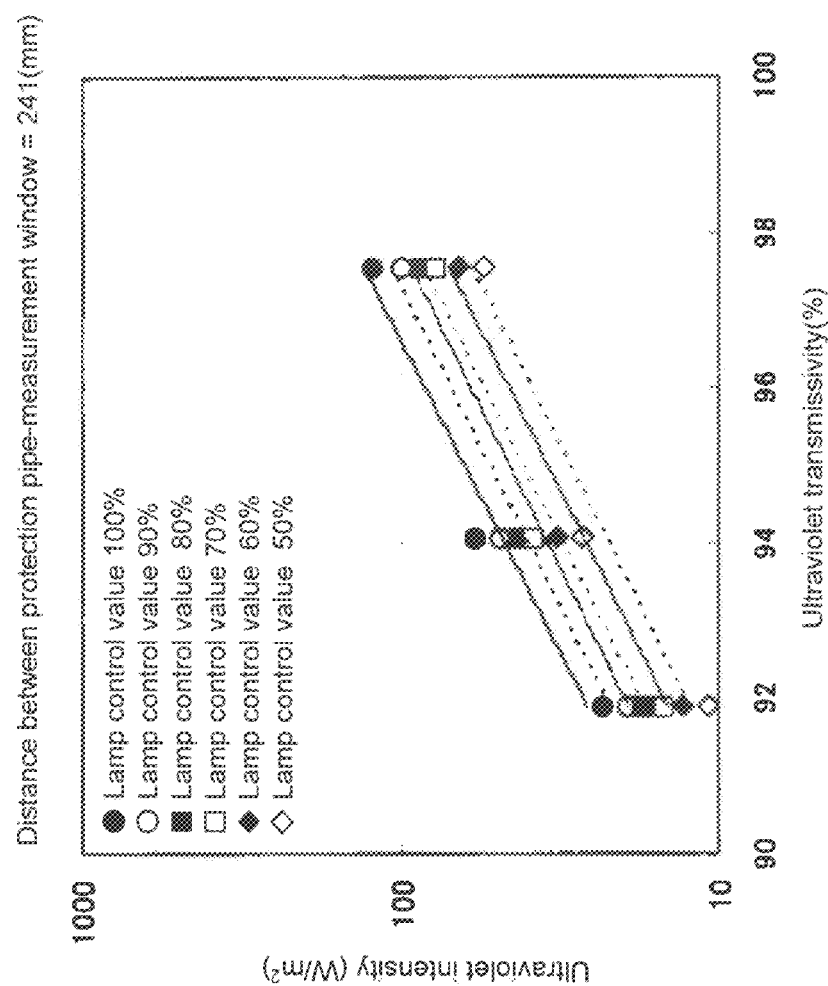
FIG. 6B3

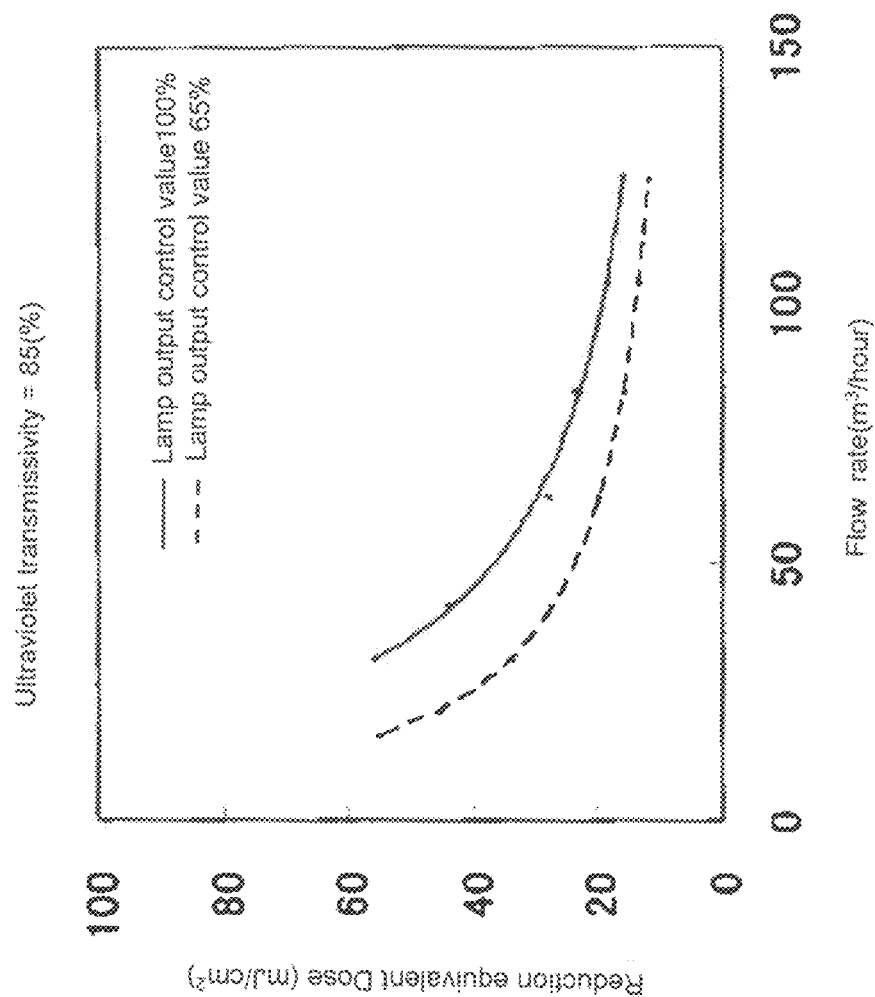
FIG. 7B1

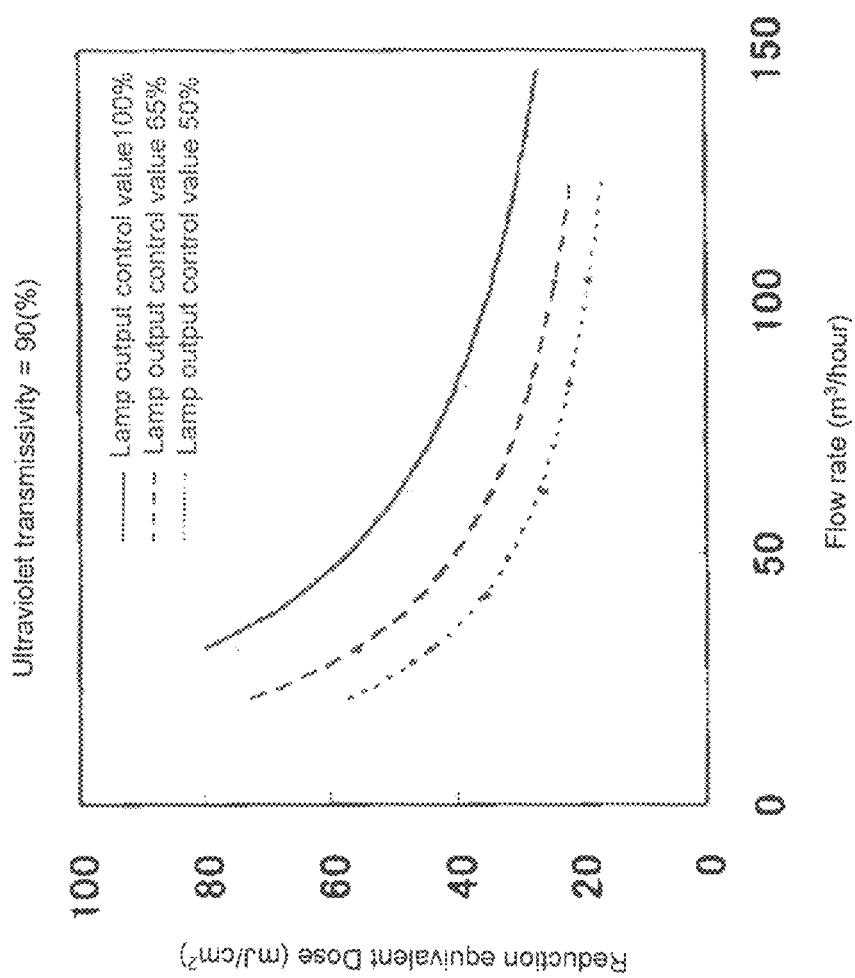
FIG. 7B2

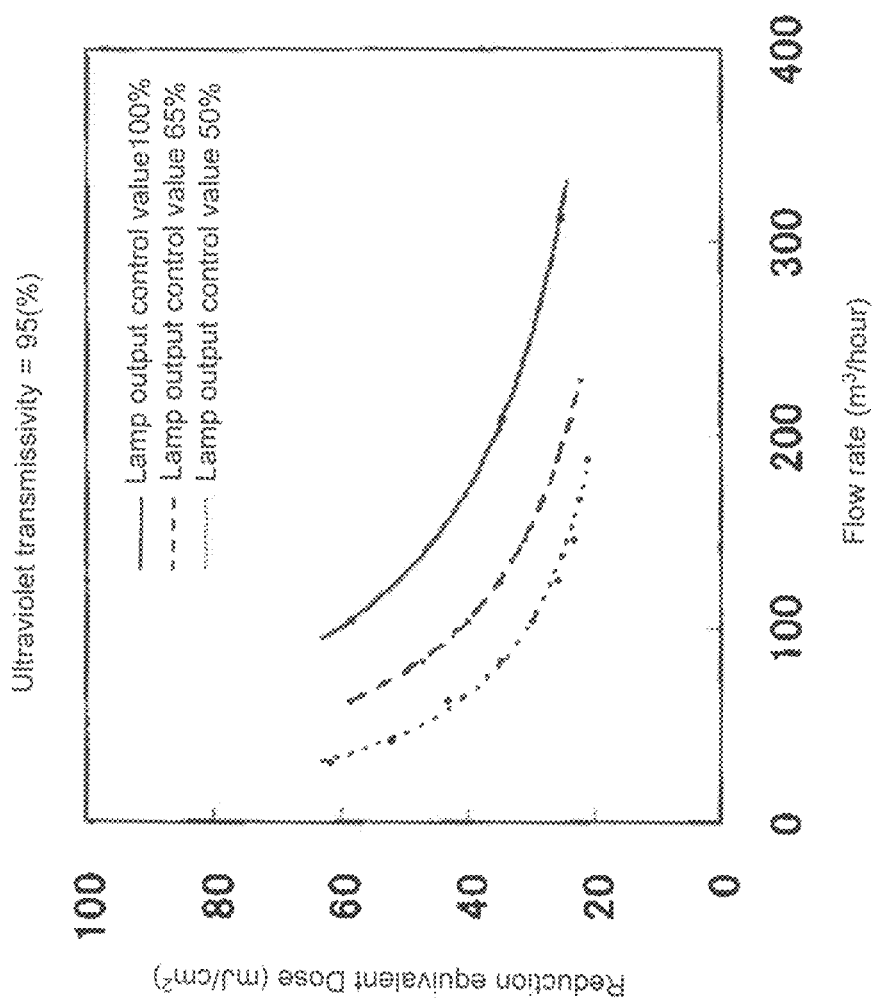
FIG. 7B3

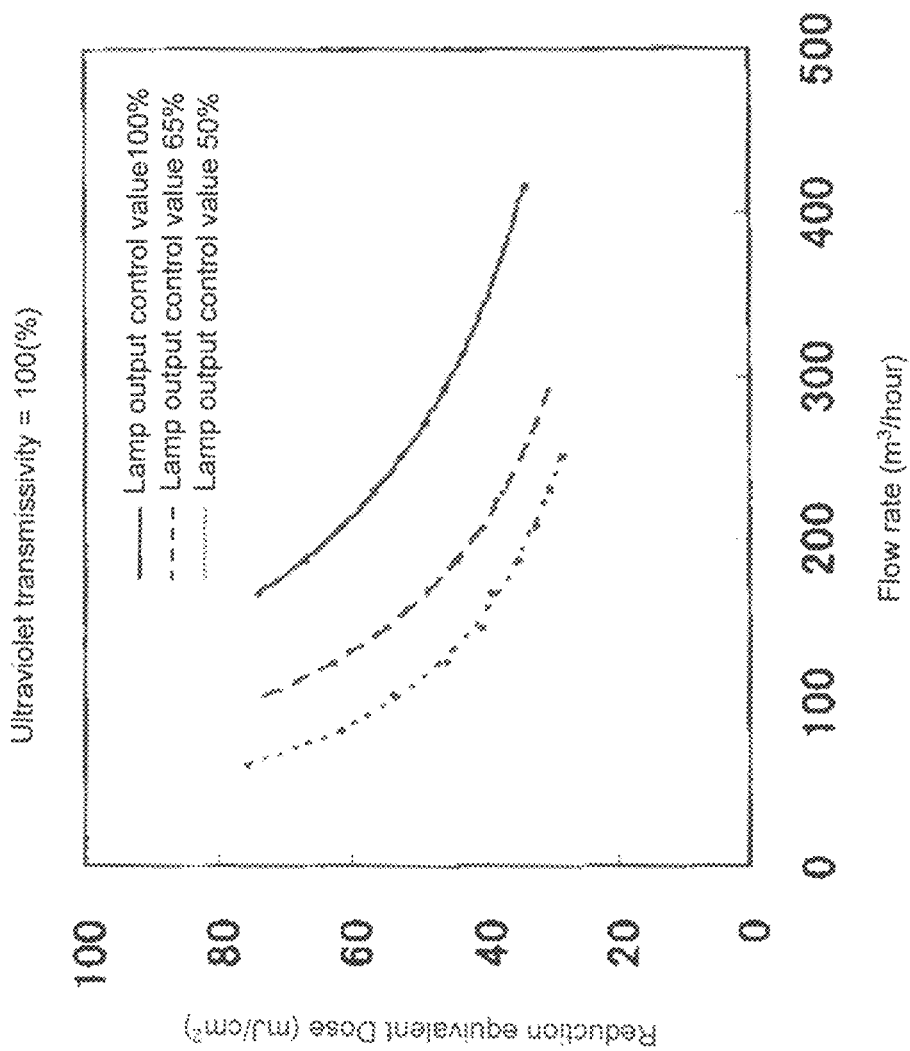
FIG. 7B4

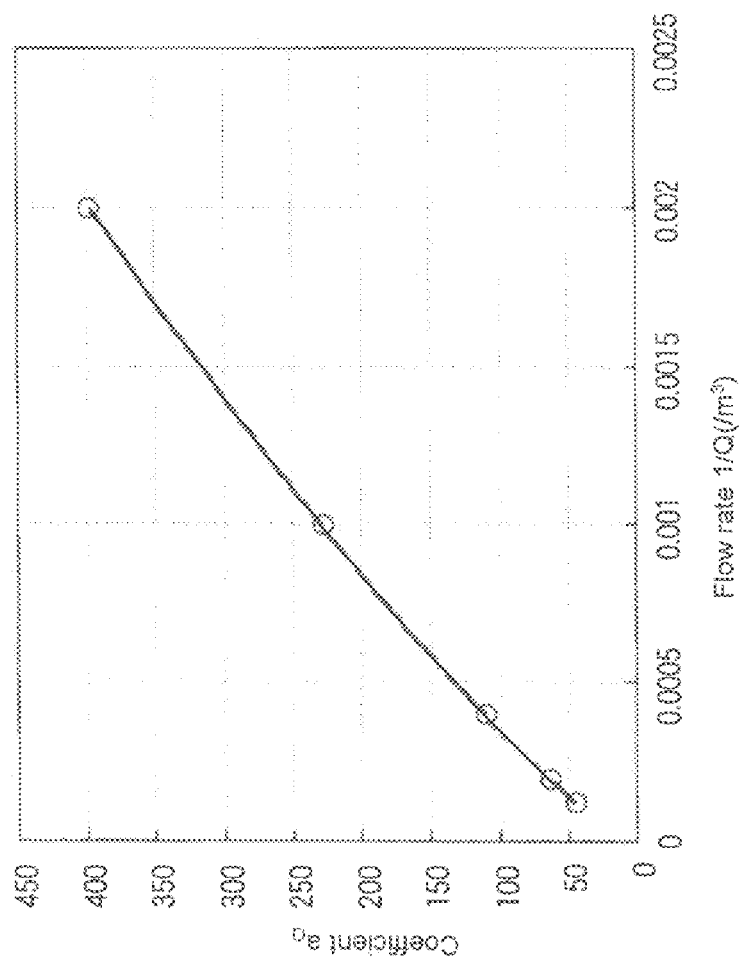

ULTRAVIOLET IRRADIATION SYSTEM

CROSS REFERENCE TO RELATED APPLICATIONS

This application is based on and claims priority to Japanese Patent Application No. 2011-059931 filed on Mar. 17, 2011, the entire contents of which are incorporated by reference herein.

FIELD

Embodiments of the invention relate to an ultraviolet irradiation system.

BACKGROUND

Ultraviolet treatment is used for disinfection and sterilization in water supply and sewerage systems.

Ultraviolet irradiation apparatuses used in the water supply and sewerage systems performs disinfection, sanitization, and inactivation within several seconds of ultraviolet irradiation. Monitoring of whether the performance of the disinfection, sanitization, and the like is maintained requires obtaining of an accurate dose of ultraviolet radiation (ultraviolet dose).

BRIEF DESCRIPTION OF THE DRAWINGS

FIGS. 6B1 to 6B3 exemplary show measurement results of a test conducted under the test conditions shown in FIG. 6A;

FIGS. 7B1 to 7B4 exemplary show analysis results obtained by a given method of analyzing the ultraviolet-intensity distribution;

FIG. 11 exemplary shows the relationship between the reciprocal of the flow rate Q and a coefficient $a_Q$ measured on condition that the distance L from the outer circumferential surface of a protection pipes 12 to a window surface 31 of the measurement window is equal to 135 mm;

DETAILED DESCRIPTION

Figure 1:
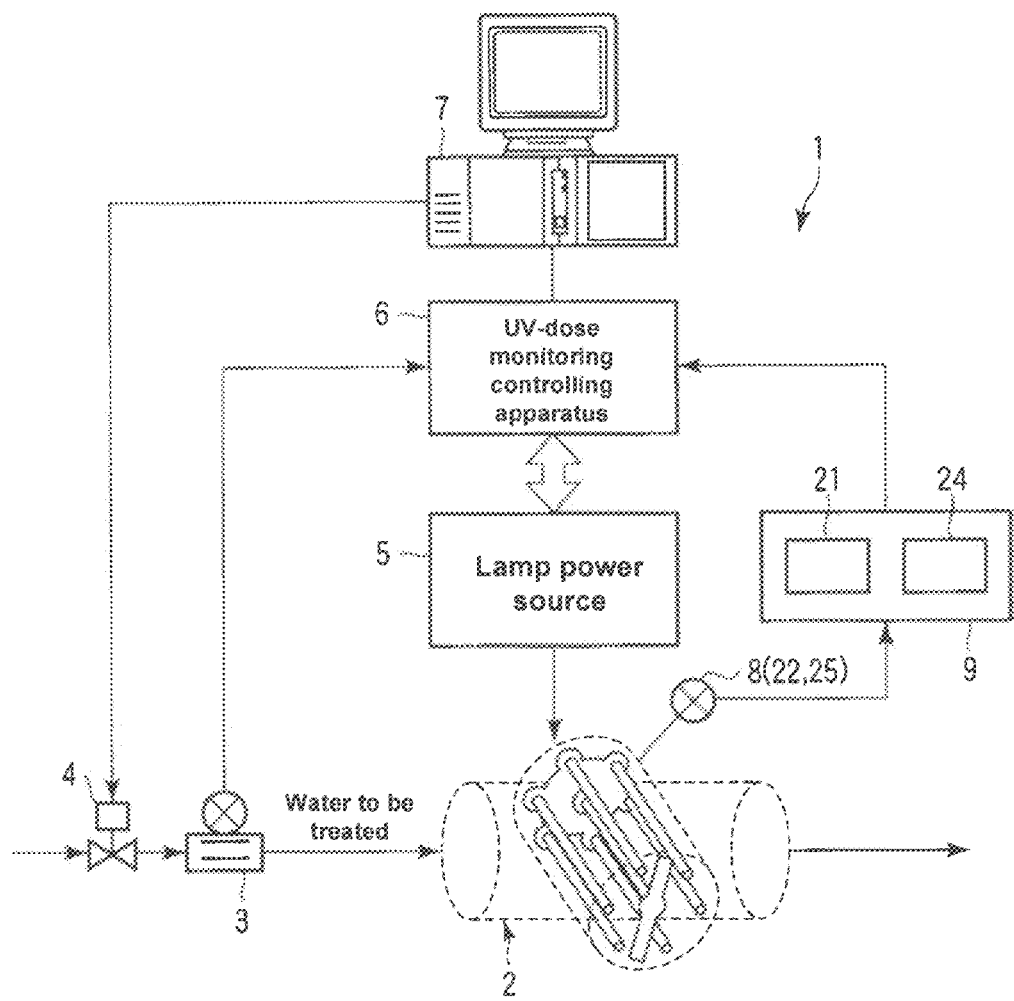
FIG. 1 exemplary shows a configuration of an ultraviolet irradiation system according to an embodiment of the invention.

An ultraviolet irradiation system according to an embodiment of the invention includes: an ultraviolet irradiation apparatus including a plurality of ultraviolet lamps, and configured to emit ultraviolet rays onto water to be treated let in the ultraviolet irradiation apparatus and to discharge the water to be treated after ultraviolet irradiation; a flowmeter configured to measure a flow rate of the water to be treated that passes through the ultraviolet irradiation apparatus; and an ultraviolet-dose monitoring and controlling apparatus configured to monitor an ultraviolet dose of the ultraviolet irradiation apparatus and to control outputs of the ultraviolet lamps. The plurality of ultraviolet lamps include a first ultraviolet lamp and a plurality of second ultraviolet lamps. The ultraviolet irradiation apparatus includes: a first measurement head configured to measure an ultraviolet intensity of the first ultraviolet lamp; and a plurality of second measurement heads configured to respectively measure ultraviolet intensities of the plurality of the ultraviolet lamps. A distance between the first ultraviolet lamp and the first measurement head is determined to form a linear relationship between a reduction equivalent ultraviolet dose and a ratio of the ultraviolet intensity measured by the first measurement head to the ultraviolet intensity measured by the first measurement head when an output control value of the first ultraviolet lamp is 100%.

The ultraviolet irradiation system according to the embodiment includes an ultraviolet-irradiation monitor and a lamp-performance-monitoring ultraviolet-irradiation monitor. The ultraviolet-irradiation monitor is configured to always monitor the ultraviolet-irradiation state in the ultraviolet irradiation apparatus. The lamp-performance-monitoring ultraviolet-irradiation monitor is configured to monitor individually the performances of the ultraviolet lamps, provided in the ultraviolet irradiation apparatus, as light sources to emit ultraviolet rays. Hence, the overall performance of the ultraviolet irradiation apparatus can be monitored accurately, and thus it is possible to avoid either excessive or insufficient ultraviolet dose by controlling the outputs of the ultraviolet lamps on the basis of this monitoring result. Thus, according to the embodiment, a more reliable ultraviolet irradiation system can be provided. In addition, according to the embodiment, an ultraviolet irradiation system capable of an energy-saving operation can be provided.

Embodiments will be described below by referring to the drawings.

Embodiment 1

FIG. 1 exemplary shows a configuration of an ultraviolet irradiation system according to an embodiment 1. An ultraviolet-treatment system 1 includes an ultraviolet irradiation apparatus 2, a flowmeter 3, a flow-rate adjustment valve 4, a lamp power source 5, an ultraviolet-dose monitoring and controlling apparatus 6, an ultraviolet-treatment-facility monitoring and controlling apparatus 7, an ultraviolet-measurement head 8, and an ultraviolet-irradiation monitor 9.

The ultraviolet-measurement head 8 is fitted in the ultraviolet irradiation apparatus 2, and is connected to the ultraviolet-irradiation monitor 9 through a dedicated line. The ultraviolet-measurement head 8 is a device to measure the ultraviolet intensity and outputs, to the ultraviolet-irradiation monitor 9, either a current signal or a voltage signal corresponding to the ultraviolet intensity.

The ultraviolet-measurement head 8 includes a first measurement head 22 and second measurement heads 25-1 to 25-6, which are to be described in detail later. The first measurement head 22 and the second measurement heads 25-1 to 25-6 measure the ultraviolet intensities of their respective measurement-target ultraviolet lamps.

The ultraviolet-irradiation monitor 9 is configured to monitor either the current signal or the voltage signal from the ultraviolet-measurement head 8, and thus monitor both the ultraviolet intensities and doses of the ultraviolet lamps. In addition, the ultraviolet-irradiation monitor 9 is configured to convert either the current signal or the voltage signal acquired from the ultraviolet-measurement head 8 to the ultraviolet intensity to be output to the ultraviolet-dose monitoring and controlling apparatus 6. Note that the ultraviolet-irradiation monitor 9 is capable of comparing the measured ultraviolet intensity S with the pre-measured ultraviolet intensity $S_0$, and then outputting the relative output $S/S_0$. The ultraviolet-irradiation monitor 9 includes a first ultraviolet-irradiation monitor 21 and second ultraviolet-irradiation monitors 24, which are to be described in detail later. The first ultraviolet-irradiation monitor 21 is connected to the first measurement head 22 by means of either wired or wireless communications. The second ultraviolet-irradiation monitors 24 (24-1 to 24-6) are connected respectively to the second measurement heads 25-1 to 25-6 by means of either wired or wireless communications.

The flow-rate adjustment valve 4 is configured to adjust the amount of the fluid to be treated which flows into the ultraviolet irradiation apparatus 2 by being opened and closed. The actions of opening and closing the valve of the flow-rate adjustment valve 4 are controlled by the ultraviolet-treatment-facility monitoring and controlling apparatus 7.

The flowmeter 3 is configured to measure the flow rate of the fluid to be treated which has passed through the flow-rate adjustment valve 4 and which is to pass through the ultraviolet irradiation apparatus 2. The flowmeter 3 outputs the measured flow rate to the ultraviolet-dose monitoring and controlling apparatus 6. The flowmeter 3 shown in FIG. 1 is positioned at the inlet side of the ultraviolet irradiation apparatus 2 and measures the flow rate of the fluid to be treated which is to flow into the ultraviolet irradiation apparatus 2. Alternatively, the flowmeter 3 may be positioned at the outlet side of the ultraviolet irradiation apparatus 2 and measure the flow rate of the fluid to be treated which to be discharged from the ultraviolet irradiation apparatus 2.

The ultraviolet-dose monitoring and controlling apparatus 6 is configured to control the lamp power source 5 on the basis on both the flow rate of the fluid to be treated measured by the flowmeter 3 and the ultraviolet intensity acquired from the ultraviolet-irradiation monitor 9.

The lamp power source 5 is configured to supply electric power to the ultraviolet lamps in the ultraviolet irradiation apparatus 2. The ultraviolet-dose monitoring and controlling apparatus 6 controls the electric power that the lamp power source 5 supplies to the ultraviolet lamps.

Figure 2:
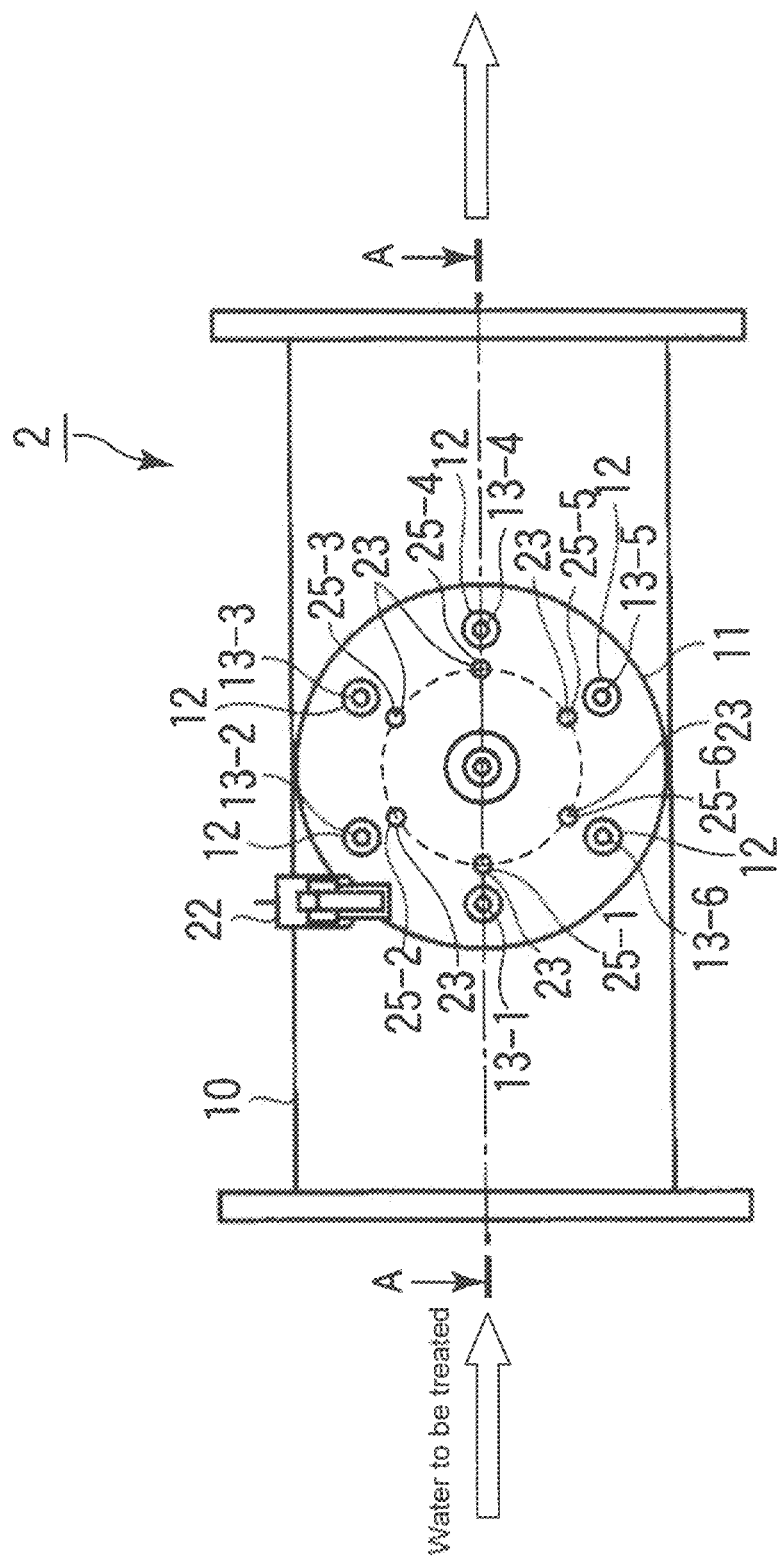
FIG. 2 exemplary shows a configuration of an ultraviolet irradiation apparatus according to an embodiment 1.
Figure 3:
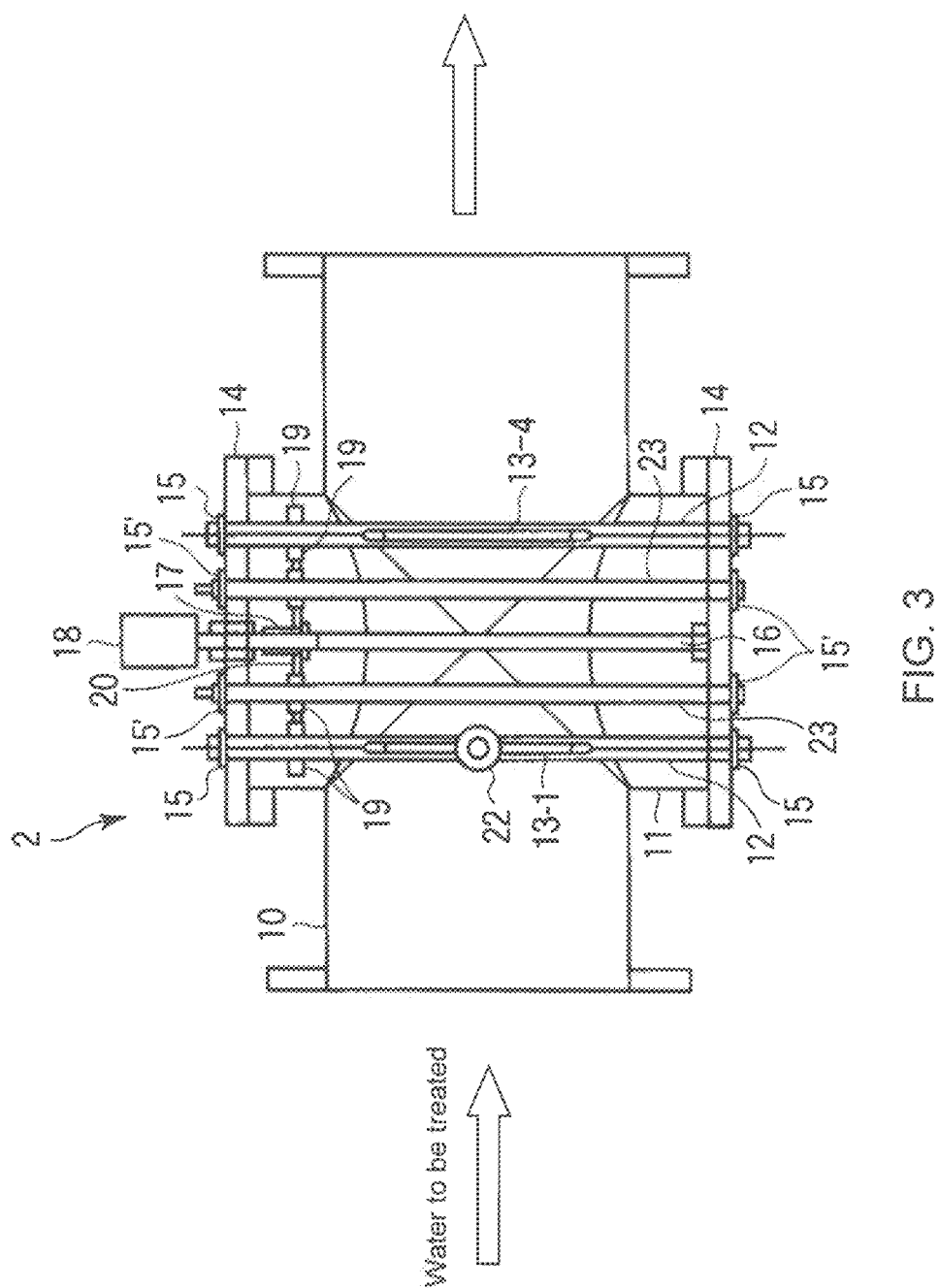
FIG. 3 exemplary shows a section taken along the line A-A of the ultraviolet irradiation apparatus shown in FIG. 2.

FIG. 2 schematically illustrates an exemplary configuration of the ultraviolet irradiation apparatus 2. FIG. 3 exemplary shows a section taken along the line A-A of the ultraviolet irradiation apparatus 2 shown in FIG. 2.

The ultraviolet irradiation apparatus 2 includes a water-passing drum 10, a pair of lamp housings 11, plural protection pipes 12, plural ultraviolet lamps 13 (13-1 to 13-6), a pair of lamp-housing lids 14, plural O-ring retainer plates 15, a cleaner-plate driving shaft 16, a movable piece 17, a drive motor 18, plural cleaner wipers 19, a cleaner plate 20, the first measurement head 22, plural measurement-head protection pipes 23, and the second measurement heads 25-1 to 25-6.

The water-passing drum 10 has a substantially cylindrical shape, and has: an inlet through which the fluid to be treated flows into; an outlet through which the fluid treated is discharged; and a wall that stretches between the inlet and the outlet. The inlet of the water-passing drum 10 is connected to the outlet of the flowmeter 3 via a flow passage.

The pair of lamp housings 11 stick outward of the water-passing drum 10 from opposite positions of the wall of the water-passing drum 10 and in a direction substantially perpendicular to the direction in which the fluid to be treated flows inside the water-passing drum 10. Each lamp housing 11 has a substantially circular cross-sectional shape on a plane substantially perpendicular to the direction in which each lamp housing 11 sticks out. To put it differently, the water-passing drum 10 and the lamp housings 11 form a substantially cross-shaped structure where two cylinders are assembled together with their respective central axes intersecting each other.

Each of the pair of lamp-housing lids 14 has a substantially circular shape. The pair of lamp-housing lids 14 are fitted respectively to the two opening ends of the lamp housings 11 to seal the two opening ends of the lamp housings 11. Each of the pair of lamp-housing lids 14 has plural openings disposed at positions that correspond respectively to the positions of the counterparts in the other lamp-housing lid 14.

Each of the plural protection pipes 12 is held with the two ends fitted respectively to the openings formed in the pair of lamp-housing lids 14. The protection pipes 12 of this embodiment are, for example, silica-glass pipes. Six protection pipes 12 are disposed with their respective axes being parallel to one another. In addition, all the six protection pipes 12 are located equidistantly on a circle.

The plural ultraviolet lamps 13 are disposed inside the respective protection pipes 12. The two end portions of each protection pipe 12 incorporating the ultraviolet lamp 13 are fixed to their corresponding openings formed in the lamp-housing lids 14. Unillustrated water-tight O-rings and the O-ring retainer plates 15 water-tightly fix the end portions of the protection pipes 12 to the lamp-housing lids 14.

The cleaner-plate driving shaft 16 is provided substantially at the central axis of each of the cylindrical lamp housings 11. The movable piece 17 is fitted onto the cleaner-plate driving shaft 16. The movable piece 17 is driven by the drive motor 18, and thereby moves along the cleaner-plate driving shaft 16.

The cleaner plate 20 is equipped with the plural cleaner wipers 19 disposed in such a manner as to surround the plural protection pipes 12, respectively. The cleaner plate 20 is assembled to the movable piece 17, and thereby moves, along with the movement of the movable piece 17, in the axial direction of the lamp housings 11. The movement of the cleaner plate 20 moves the cleaner wipers 19 in the axial direction of the respective protection pipes 12 while being in contact with the outer circumferential surface of the protection pipes 12. Hence, the cleaner wipers 19 can clean the contamination off the outer circumferential surfaces of the protection pipes 12.

The first measurement head 22 is assembled to both the water-passing drum 10 and the lamp housing 11. The first measurement head 22 is configured to measure the ultraviolet intensity in the ultraviolet irradiation apparatus 2. The first measurement head 22 is connected to the first ultraviolet-irradiation monitor 21, which is configured to monitor the ultraviolet dose. The first measurement head 22 is configured to measure the ultraviolet intensity of the ultraviolet lamp 13-1 which is used as a reference to control the outputs of all the ultraviolet lamps 13 provided in the ultraviolet irradiation apparatus 2.

In the ultraviolet irradiation apparatus 2, the plural measurement-head protection pipes 23 respectively corresponding to the plural protection pipes 12 are disposed. The measurement-head protection pipes 23 are silica-glass pipes. Each of the measurement-head protection pipes 23 is disposed on the line connecting the central axis of the lamp housings 11 to the central axis of the corresponding one of the ultraviolet lamps 13-1 to 13-6. In addition, the measurement-head protection pipes 23 are disposed in parallel to the ultraviolet lamps 13-1 to 13-6. The measurement-head protection pipes 23 are fitted respectively to the openings formed in the lamp-housing lids 14.

The second measurement heads 25-1 to 25-6 are installed respectively in the plural measurement-head protection pipes 23. The second measurement heads 25-1 to 25-6 measure, respectively, the ultraviolet intensities of the ultraviolet lamps 13-1 to 13-6. The second measurement heads 25-1 to 25-6 are connected respectively to the second ultraviolet-irradiation monitors 24, which are configured to monitor, respectively the ultraviolet intensities of the ultraviolet lamps 13-1 to 13-6.

Now, description is given below of an example of the structure to install the second measurement heads 25-1 to 25-6.

Figure 4:
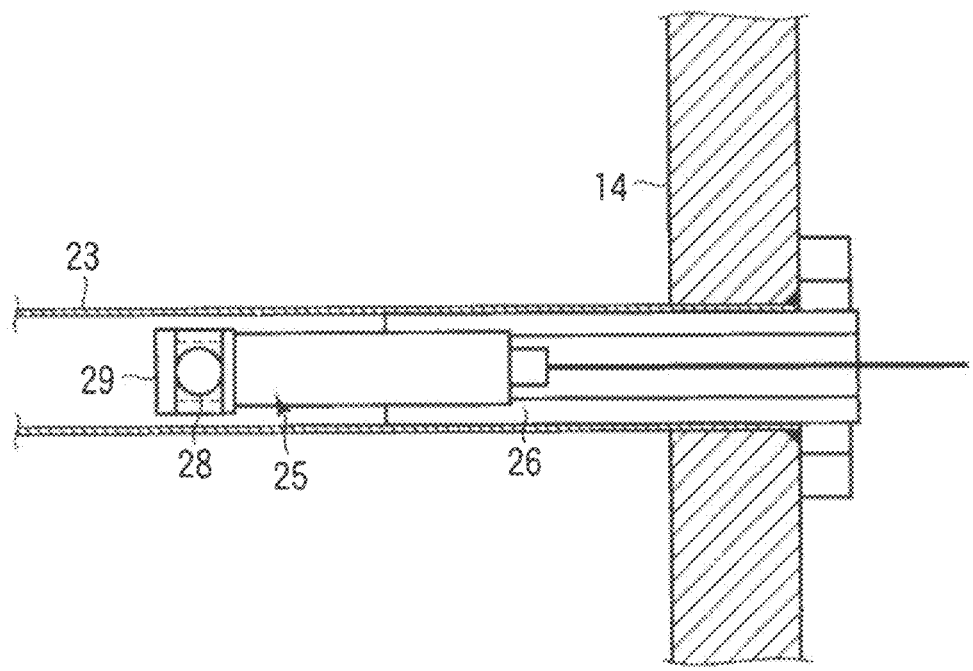
FIG. 4 exemplary shows an installation structure of a second measurement head provided in the ultraviolet irradiation apparatus.

FIG. 4 exemplary shows a method of installing each of the second measurement heads 25-1 to 25-6.

In FIG. 4, one of the measurement-head protection pipes 23 is fitted to the corresponding one of the openings formed in one of the lamp-housing lids 14. The second measurement head 25 (25-1 to 25-6) is fixed to a predetermined position in the measurement-head protection pipe 23 by means of a measurement-head supporting member 26.

Figure 5:
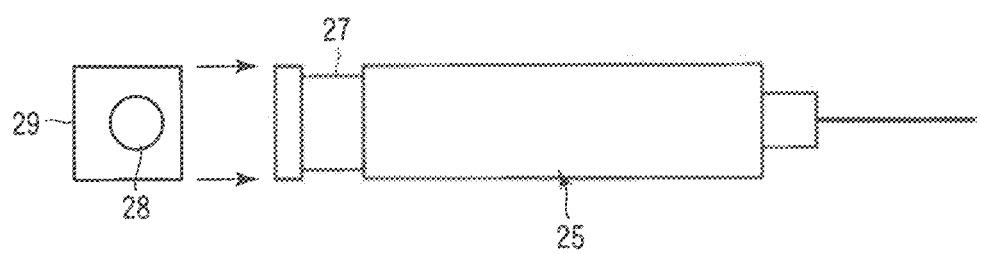
FIG. 5 exemplary shows a configuration of a second measurement head.

FIG. 5 illustrates a configuration of the second measurement head 25 (25-1 to 25-6). Each of the second measurement heads 25-1 to 25-6 includes a columnar-shaped main body 25a and a photo-receiver portion 27 that is provided at the leading end portion of the main body 25a and has a photo-receiving surface formed along the axial direction. The photo-receiver portion 27 is capable of detecting ultraviolet rays that come in any direction of 360°. A cylindrical-shaped light-blocking cap 29 is fitted to the photo-receiver portion 27, and has a light-guiding hole 28 designed to restrict the direction in which ultraviolet rays enter the photo-receiver portion 27. The light-blocking cap 29 is fitted to the photo-receiver portion 27 so that the light-guiding hole 28 can be directed towards the measurement-target one of the ultraviolet lamps 13-1 to 13-6.

Figure 6A:
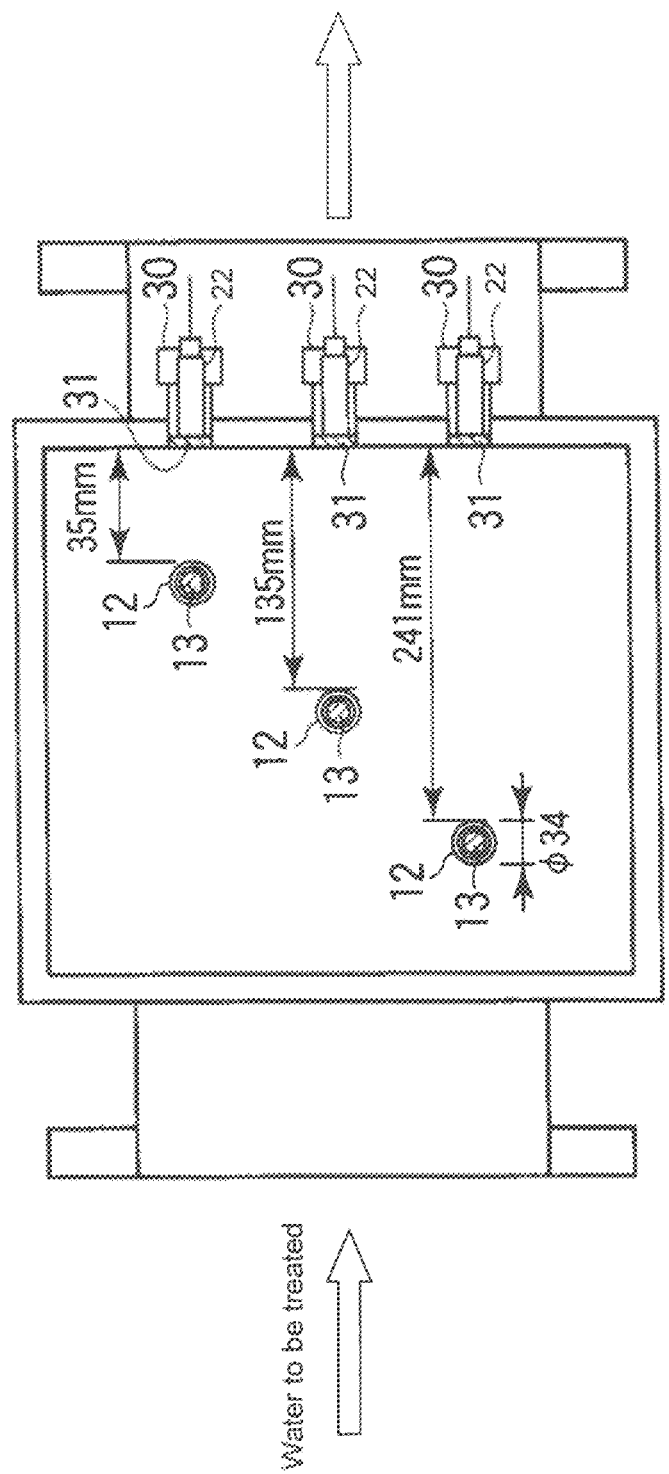
FIG. 6A exemplary shows test conditions with different distances from the outer circumferential surface of a protection pipe of a first measurement head to the window surface of a measurement window.
Figure 6C:
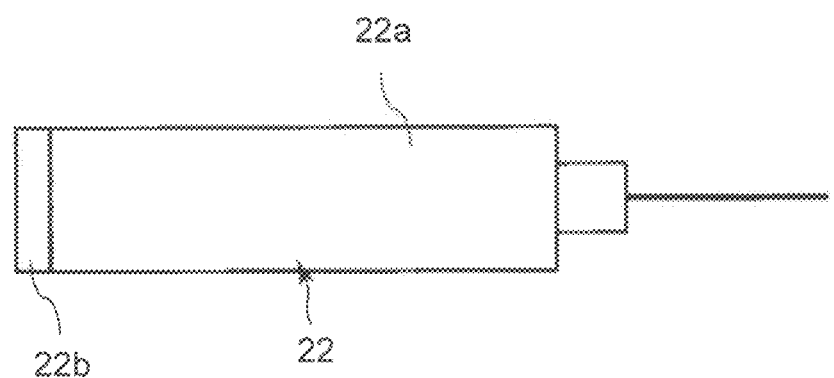
FIG. 6C exemplary shows a configuration of a first measurement head.

The first measurement head 22 is installed in a measurement window 30 (an example of which is shown in FIG. 6A) formed in a wall of either the water-passing drum 10 or of the lamp housings 11. The measurement window 30 is formed so that the distance between a window surface 31 and the surface of the protection pipe 12 for the measurement-target ultraviolet lamp 13-1 is 135 mm. As shown in FIG. 6C, the first measurement head 22 includes a columnar-shaped main body 22a and a photo-receiver portion 22b that is provided at the leading end of the main body 22a and has a photo-receiving surface that is perpendicular to the direction of the central axis of the main body 22a.

This 135-mm provides the optimal positional relation in which, at a given flow rate of the water to be treated, the ultraviolet dose in the ultraviolet irradiation apparatus 2 can be calculated as a function of only the ultraviolet intensity measured by the first ultraviolet-irradiation monitor 21 and the flow rate, even if changes occur in the ultraviolet transmissivity of the water to be treated and/or in the output of the ultraviolet lamp 13-1. Specifically, this 135-mm distance is determined on the basis of a test described below and of the result of analyzing the ultraviolet dose in the ultraviolet irradiation apparatus.

The test described below was conducted to study how the value measured by first ultraviolet-irradiation monitor 21 changes if changes occur in the positional relation between the ultraviolet lamp 13 and the first measurement head 22, in the ultraviolet transmissivity, or in the output of the ultraviolet lamp 13. The ultraviolet transmissivity mentioned above means the proportion of the ultraviolet rays that pass through the water to be treated in a case where ultraviolet rays of a 253.7-nm wavelength transmits the water to be treated by a distance of 1 cm. The positional relation between the ultraviolet lamp 13 and the first measurement head 22 is expressed by the distance between the outer circumferential surface of the protection pipe 12 that covers the ultraviolet lamp 13 and the window surface 31 of the measurement window 30 where the first measurement head 22 is installed.

FIG. 6A is a diagram to explain some examples of the test conditions.

In this test, the first measurement head 22 and the ultraviolet lamp 13 were placed with a 35-mm distance, a 135-mm distance, and a 241-mm distance from the outer circumferential surface of the protection pipe 12 and the window surface 31 of the measurement window 30. The intensity of ultraviolet rays that pass through the water to be treated was measured. In this test, the ultraviolet transmissivity of the water to be treated for the ultraviolet rays of 253.7-nm wavelength is varied between approximately 80% and 100% and the output control value of the ultraviolet lamp 13 is varied between 50% to 100%. When the output control value is 100%, an electric power that is equal to the rated electric power of the ultraviolet lamp 13 was inputted into the ultraviolet lamp 13.

FIG. 6B1 to FIG. 6B3 exemplary shows, respectively, the measurement results of the cases where a 35-mm distance, a 135-mm distance, and a 241-mm distance were secured between the outer circumferential surface of the protection pipe 12 and the window surface 31 of the measurement window 30.

Figure 7A:
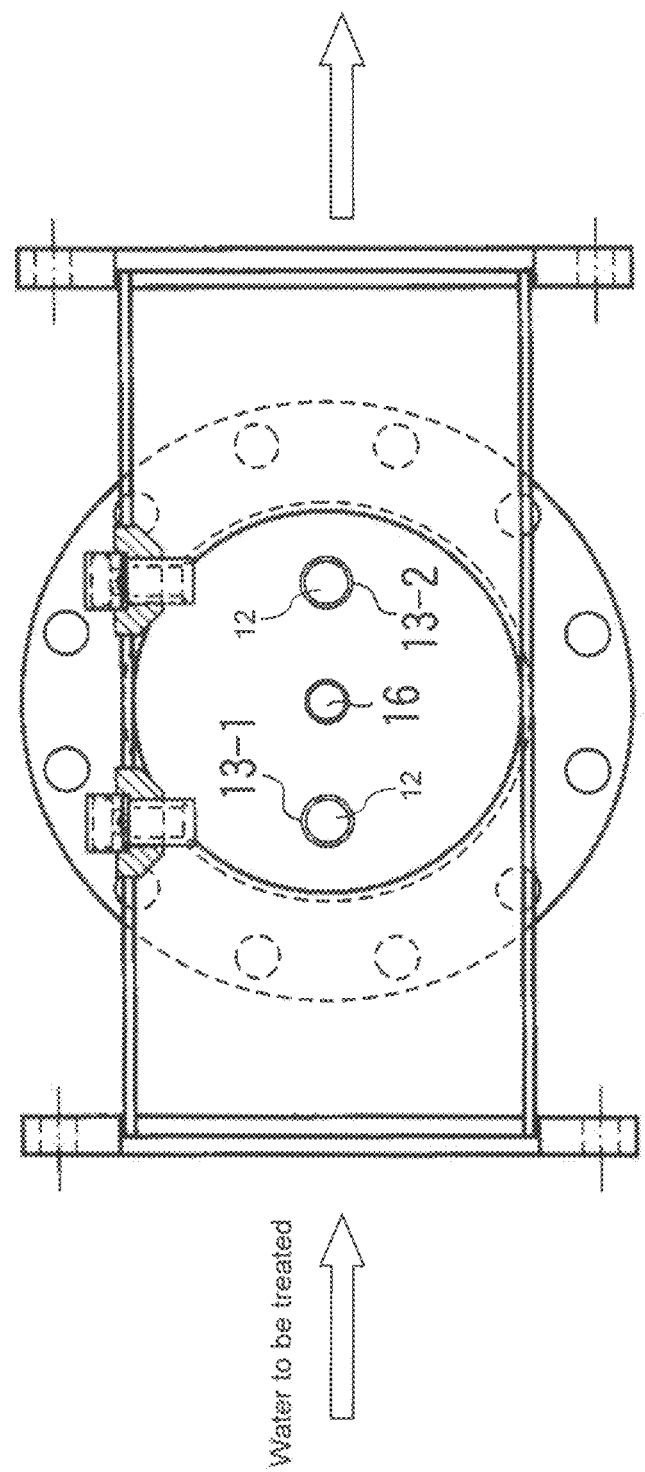
FIG. 7A is a diagram to explain an example of a method of analyzing the ultraviolet dose of the ultraviolet irradiation apparatus.

FIG. 7A is a diagram to explain an example of a method of analyzing the ultraviolet dose in the ultraviolet irradiation apparatus. In the analysis of the ultraviolet dose in the ultraviolet irradiation apparatus, the ultraviolet dose in the ultraviolet irradiation apparatus shown in FIG. 7A was calculated as an example. The coli phage MS2 was used as the indicator organism. The trajectory of each organism moving between the inlet and the outlet of the ultraviolet irradiation apparatus was acquired by the flow analysis. In addition, the ultraviolet intensity of the ultraviolet lamp 13, the ultraviolet transmissivities of the protection pipe 12 for different wavelengths, and the ultraviolet transmissivities of the water to be treated for different wavelengths were taken into consideration, and therefore the ultraviolet-irradiation-intensity distribution in the ultraviolet irradiation apparatus was calculated by using the formula (1), described later, that expresses the ultraviolet irradiation. The above-mentioned ultraviolet intensity of the ultraviolet lamp 13 is the intensity of ultraviolet rays with various wavelengths ranging from 200 nm to 300 nm with 5-nm increments. The ultraviolet-dose distribution was calculated as a product of the intensity of the ultraviolet rays with which an organism was irradiated while moving from the inlet to the outlet of the ultraviolet irradiation apparatus and a time taken by the organism to move from the inlet to the outlet of the ultraviolet irradiation apparatus. The reduction equivalent ultraviolet dose (herein after abbreviated as RED) based on the ultraviolet-dose distribution was analyzed on the same conditions as those of the test.

The ultraviolet lamps 13-1 and 13-2 shown in the ultraviolet irradiation apparatus shown in FIG. 7A are medium-pressure ultraviolet lamps with 3-kW electric power consumption. Each of the protection pipes 12 is a special silica-glass pipe with a 34-mm external diameter and a 2-mm wall thickness. The special silica-glass pipe were pre-treated to block ultraviolet rays with wavelengths of 240 nm or shorter. Of the two ultraviolet lamps 13-1 and 13-2 provided in the ultraviolet irradiation apparatus, only the ultraviolet lamp 13-2 was turned ON, and the ultraviolet lamp 13-1 was kept OFF.

To analyze the ultraviolet-intensity distribution, the ultraviolet-intensity distribution in the ultraviolet irradiation apparatus was calculated by the following formula (1).

$$I'_\lambda = k_\lambda f_L f_Q f_D f_A \int_0^1 \frac{1}{PX^2} (T/100)^{[PX(r-q)/r]} dx \quad (1)$$

In the formula (1) above, $k_\lambda$: a constant that is unique to each lamp and is associated with the ultraviolet intensity of the lamp;

PX: the distance from the light-emitting spot;

r: the radial distance between the lamp and the position for the ultraviolet-intensity calculation;

q: the radius of the protection pipe;

T: the ultraviolet transmissivity (%) of the water to be treated;

$f_L$: the degradation coefficient of the lamp;

$f_Q$: the transmissivity of the protection pipe;

$f_D$: the contamination coefficient of the protection pipe; and $f_A$: a coefficient corresponding to factors other than the ones mentioned above.

The validity of the analysis method describe above has already been verified in the following document Abe et al., "Comparison of ultraviolet Dose Analysis and Verification Test of ultraviolet-Reactor with Medium pressure Lamps," Journal of the Society of Environmental Instrumentation Control and Automation, Vol. 15, No. 2/3, pp. 52-54, October, 2010, Japan.

Figure 8:
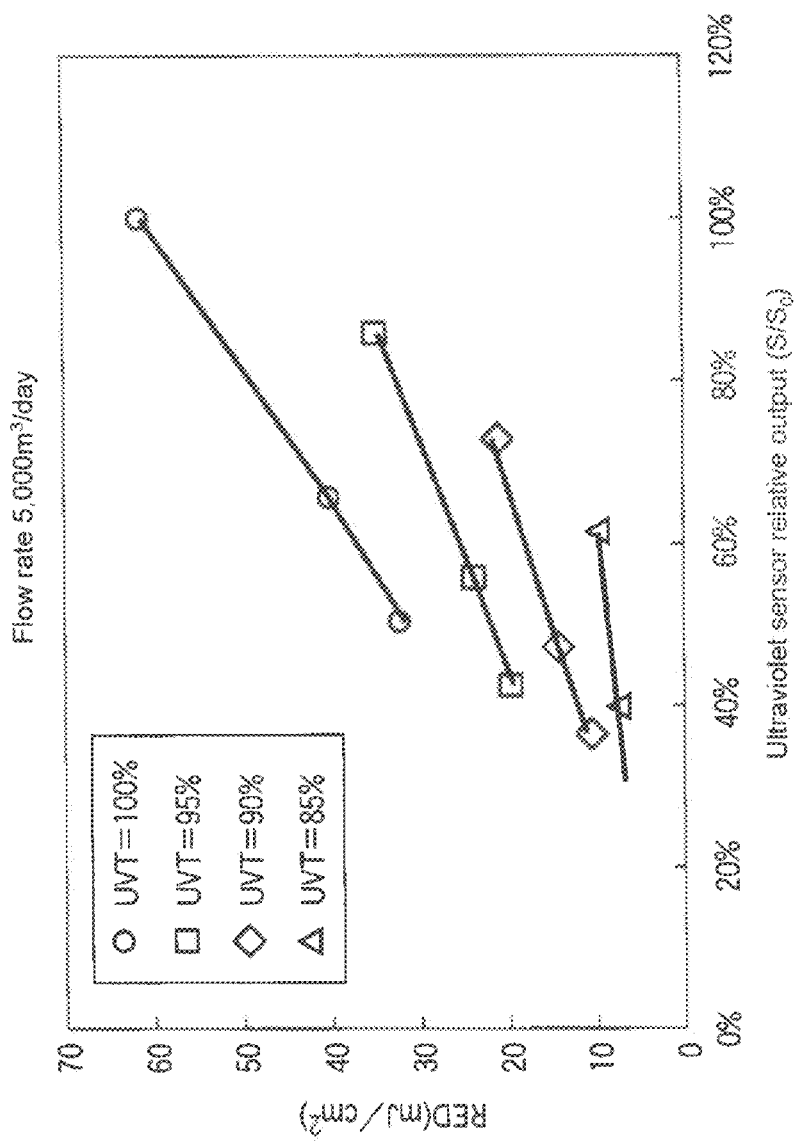
FIG. 8 exemplary shows the relationship between the ultraviolet-irradiation-monitor relative output and the reduction equivalent ultraviolet dose for different ultraviolet transmissivities of the water to be treated measured on condition that the distance L from the outer circumferential surface of the protection pipe to the window surface of the measurement window is equal to 35 mm.
Figure 9:
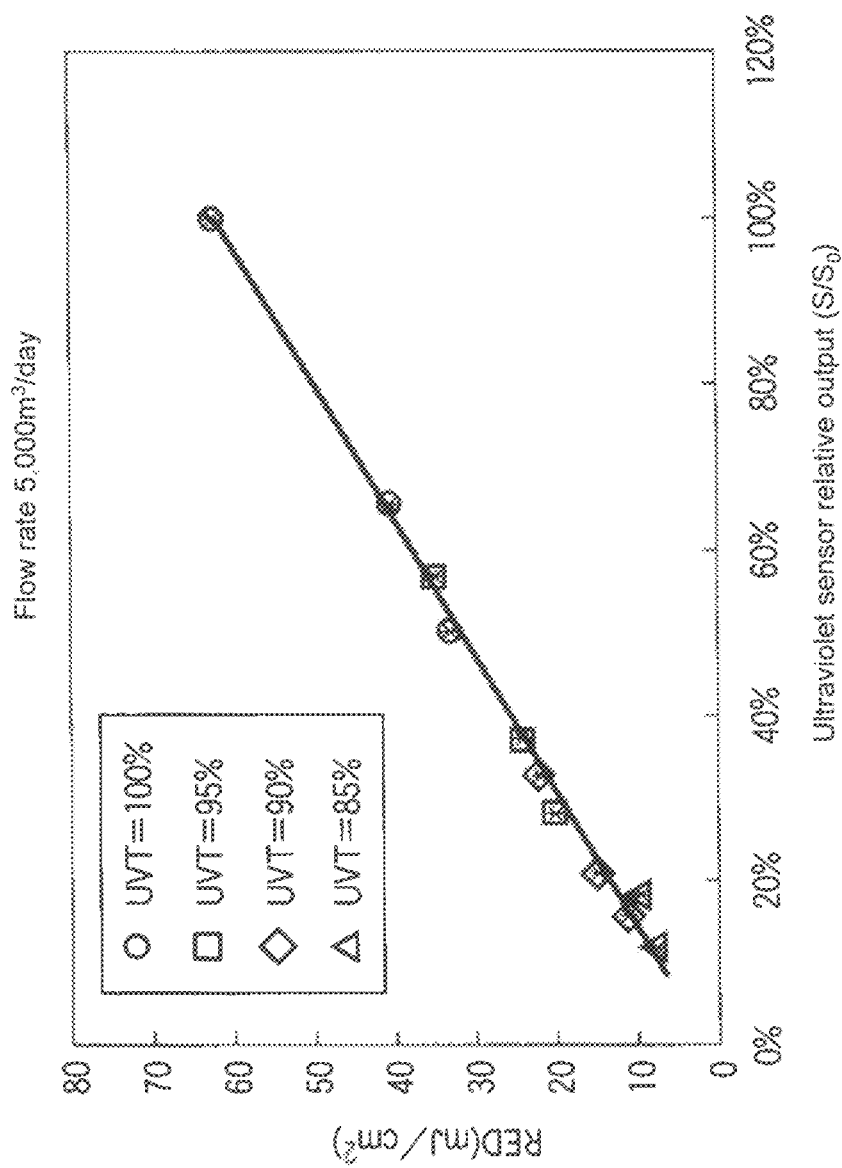
FIG. 9 exemplary shows the relationship between the ultraviolet-irradiation-monitor relative output and the reduction equivalent ultraviolet dose for different ultraviolet transmissivities of the water to be treated measured on condition that the distance L from the outer circumferential surface of the protection pipe to the window surface of the measurement window is equal to 135 mm.
Figure 10:
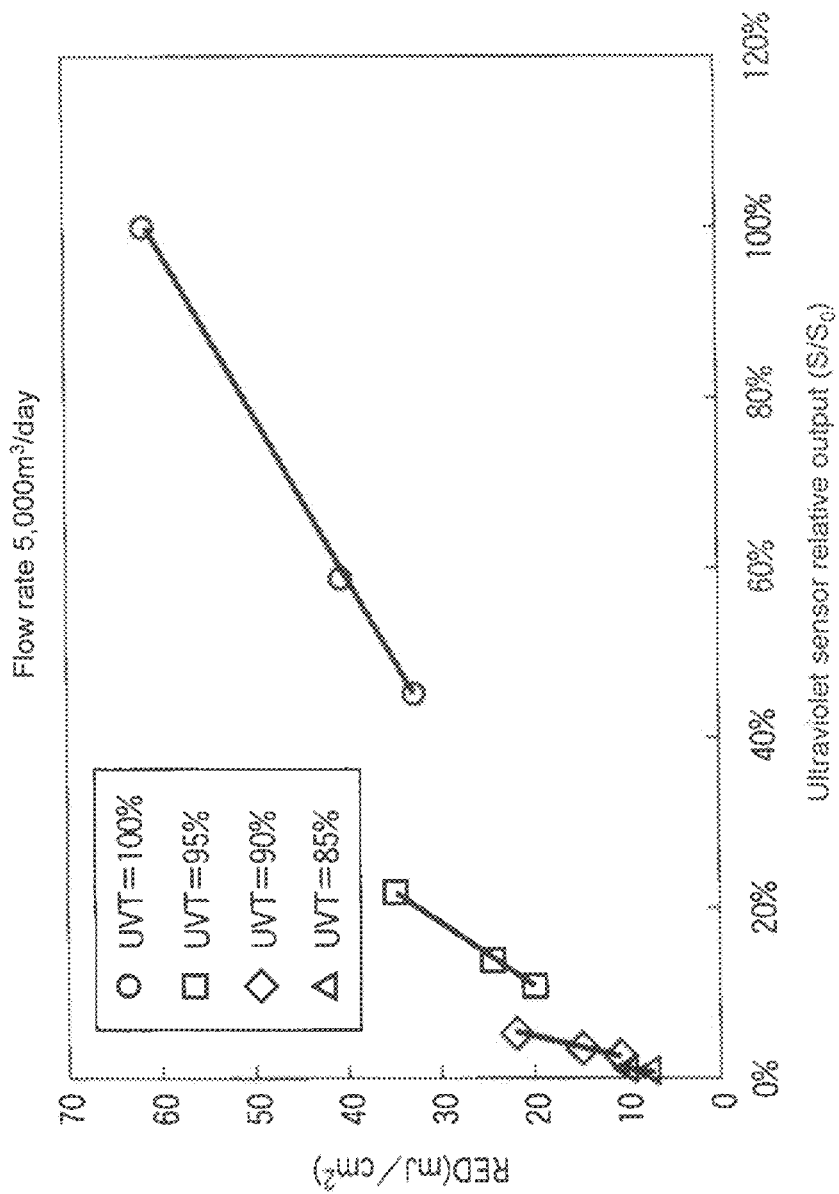
FIG. 10 exemplary shows the relationship between the ultraviolet-irradiation-monitor relative output and the reduction equivalent ultraviolet dose for different ultraviolet transmissivities of the water to be treated measured on condition that the distance L from the outer circumferential surface of the protection pipe to the window surface of the measurement window is equal to 241 mm.

FIGS. 7B1 to 7B4 exemplary show the analysis results obtained by the above-described method of analyzing the ultraviolet-intensity distribution. FIGS. 8 to 10 exemplary show relationships between the ultraviolet-irradiation-monitor relative output $S/S_0$ and the reduction equivalent ultraviolet dose (RED). The relationships are obtained on the basis of the relationships between the ultraviolet intensities S measured at the various positions of the first measurement head 22 shown in FIGS. 6B1 to 6B3 and the various reduction equivalent ultraviolet doses (REDs) shown in FIGS. 7B1 to 7B4. The symbol $S_0$ represents the ultraviolet intensity (mW/cm$^2$) of a case where the water to be treated has an ultraviolet transmissivity (UVT) of 100% and the ultraviolet lamp has an output control value of 100%.

FIG. 8 exemplary shows a relationship between the ultraviolet-irradiation-monitor relative output $S/S_0$ and the reduction equivalent ultraviolet dose (RED) of a case where the distance L from the outer circumferential surface of the protection pipes 12 to the window surface 31 of the measurement window 30 is 35 mm and the flow rate is 5000 (m$^3$/day).

FIG. 9 exemplary shows a relationship between the ultraviolet-irradiation-monitor relative output $S/S_0$ and the reduction equivalent ultraviolet dose (RED) of a case where the distance L from the outer circumferential surface of the protection pipes 12 to the window surface 31 of the measurement window 30 is 135 mm and the flow rate is 5000 (m$^3$/day).

FIG. 10 exemplary shows a relationship between the ultraviolet-irradiation-monitor relative output $S/S_0$ and the reduction equivalent ultraviolet dose (RED) of a case where the distance L from the outer circumferential surface of the protection pipes 12 to the window surface 31 of the measurement window 30 is 241 mm and the flow rate is 5000 (m$^3$/day).

The following observations can be obtained by comparing the relationships between the ultraviolet-irradiation-monitor relative output $S/S_0$ and the reduction equivalent ultraviolet dose (RED) shown in FIGS. 8 to 10. In each of FIGS. 8 and 10, plural lines, which represent different linear functions, are drawn for the different ultraviolet transmissivities (UVTs) of the water to be treated as the lines expressing the relationship between the ultraviolet-irradiation-monitor relative output $S/S_0$ and the reduction equivalent ultraviolet dose (RED).

In contrast, in FIG. 9, only one line representing a single liner function is drawn as the line expressing the relationship between the ultraviolet-irradiation-monitor relative output $S/S_0$ and the reduction equivalent ultraviolet dose (RED).

When the distance L from the outer circumferential surface of the protection pipes 12 for the ultraviolet lamp to the window surface 31 of the measurement window 30 is 135 mm, the line expressing the relationship between the ultraviolet-irradiation-monitor relative output $S/S_0$ and the reduction equivalent ultraviolet dose (RED) can be represented by a predetermined linear function irrespective of the ultraviolet transmissivity (UVT) of the water to be treated. So, the reduction equivalent ultraviolet dose (RED) corresponding to a predetermined relative output can be calculated by identifying the linear function.

Accordingly, it is clear that the first measurement head 22 is optimally disposed at a position where a distance L from the outer circumferential surface of the protection pipes 12 for the ultraviolet lamp to the window surface 31 of the measurement window 30 is 135 mm. On the basis of this result, the distance L from the outer circumferential surface of the protection pipes 12 for the ultraviolet lamp to the window surface 31 of the measurement window 30 where the first measurement head 22 is installed is preferably set at 135 mm within a tolerance of ±5 mm. In short, a preferable range of the distance L is from 130 mm to 140 mm.

In this case, the distance between the second measurement head and the corresponding ultraviolet lamp whose ultraviolet intensity is measured by the second measurement head is equal to or shorter than the distance L between the first measurement head and the ultraviolet lamp whose ultraviolet intensity is measured by the first measurement head.

When the first measurement head 22 is disposed at the above-described optimal position, the reduction equivalent ultraviolet dose (RED) can be calculated, by using the formula (2), as a function of the relative output $S/S_0$ of the first ultraviolet-irradiation monitor 21 and the flow rate of the water to be treated. Accordingly, it is no longer necessary to monitor on-line the ultraviolet transmissivity of the water to be treated.

$$RED = a_{Q=5000} \times \left(\frac{S}{S_0}\right) \quad (2)$$

In the formula (2) above,
RED: the reduction equivalent ultraviolet dose (mJ/cm$^2$);
S: the measured ultraviolet intensity (W/m$^2$);
$S_0$: the ultraviolet intensity (W/m$^2$) at ultraviolet lamp output control value of 100%;
Q: the flow rate (m$^3$/day); and
$a_Q$=5000: a coefficient calculated by the linear function shown in FIG. 9.

The relationship expressed by the formula (2) was studied for various flow rates when a distance L from the outer circumferential surface of the protection pipes 12 to the window surface 31 of the measurement window 30 was 135 mm. FIG. 11 shows the relationship between the coefficient $a_Q$ and the reciprocal of the flow rate Q for the various flow-rate conditions. The points each representing a set of the reciprocal of the flow rate Q of each flow-rate condition and the corresponding coefficient $a_Q$ are plotted in a graph with the vertical axis representing the coefficient $a_Q$ and the horizontal axis representing the reciprocal of the flow rate Q. The curved line shown in FIG. 11 is a line approximated by the following formula (3).

$$a_Q = b \times \left(\frac{1}{Q}\right)^c \quad (3)$$

In the formula (3) above,
$a_Q$: a coefficient of a case where the relationship between the ultraviolet-irradiation-monitor relative output $S/S_0$ and the reduction equivalent ultraviolet dose (RED) for each of the arbitrarily determined flow rates is approximated by the formula (2) described above;
b: a constant in the approximated formula using a power math function shown in FIG. 11;
c: an exponent in the power math function shown in FIG. 11; and
Q: the flow rate (m$^3$/day).

When the first measurement head 22 is disposed at the above-described optimal position, the following formula (4) is calculated from the formulae (2) and (3) described above. The formula (4) indicates that the reduction equivalent ultraviolet dose (RED) is a function of the relative output $S/S_0$ of the first ultraviolet-irradiation monitor 21 and the flow rate of the water to be treated. According to the formula (4), the reduction equivalent ultraviolet dose (RED) is calculated from the relative output $S/S_0$ of the first ultraviolet-irradiation monitor 21 and the flow rate of the water to be treated. Accordingly, for the purpose of obtaining the reduction equivalent ultraviolet dose (RED), it is no longer necessary to monitor on-line the ultraviolet transmissivity of the water to be treated.

$$RED = b \times \left(\frac{S}{S_0}\right) \times \left(\frac{1}{Q}\right)^c \quad (4)$$

Next, a method of controlling the outputs of the ultraviolet lamps 13 will be described by referring to FIGS. 1, 2, and 12. In this embodiment, the ultraviolet-dose monitoring and controlling apparatus 6 firstly adjusts the output of the ultraviolet lamp whose ultraviolet intensity is measured by the first measurement head 22 on the basis of the flow rate measured by the flowmeter 3 and the value measured by the first measurement head 22 (i.e., the relative output of the first ultraviolet-irradiation monitor 21). Then, the second measurement 25 head configured to measure the ultraviolet lamp with the adjusted output measures the ultraviolet intensity of the ultraviolet lamp. The measured valued thus obtained is used as a target value. Then, the second measurement head 25 configured to measure another one of the ultraviolet lamps measures the ultraviolet intensity of the other ultraviolet lamp, and then the ultraviolet-dose monitoring and controlling apparatus 6 adjust the output of the other ultraviolet lamp so that the measured value can match the target value. The ultraviolet-dose monitoring and controlling apparatus 6 adjusts the output of each of the other ultraviolet lamps in a similar manner.

Figure 12A:
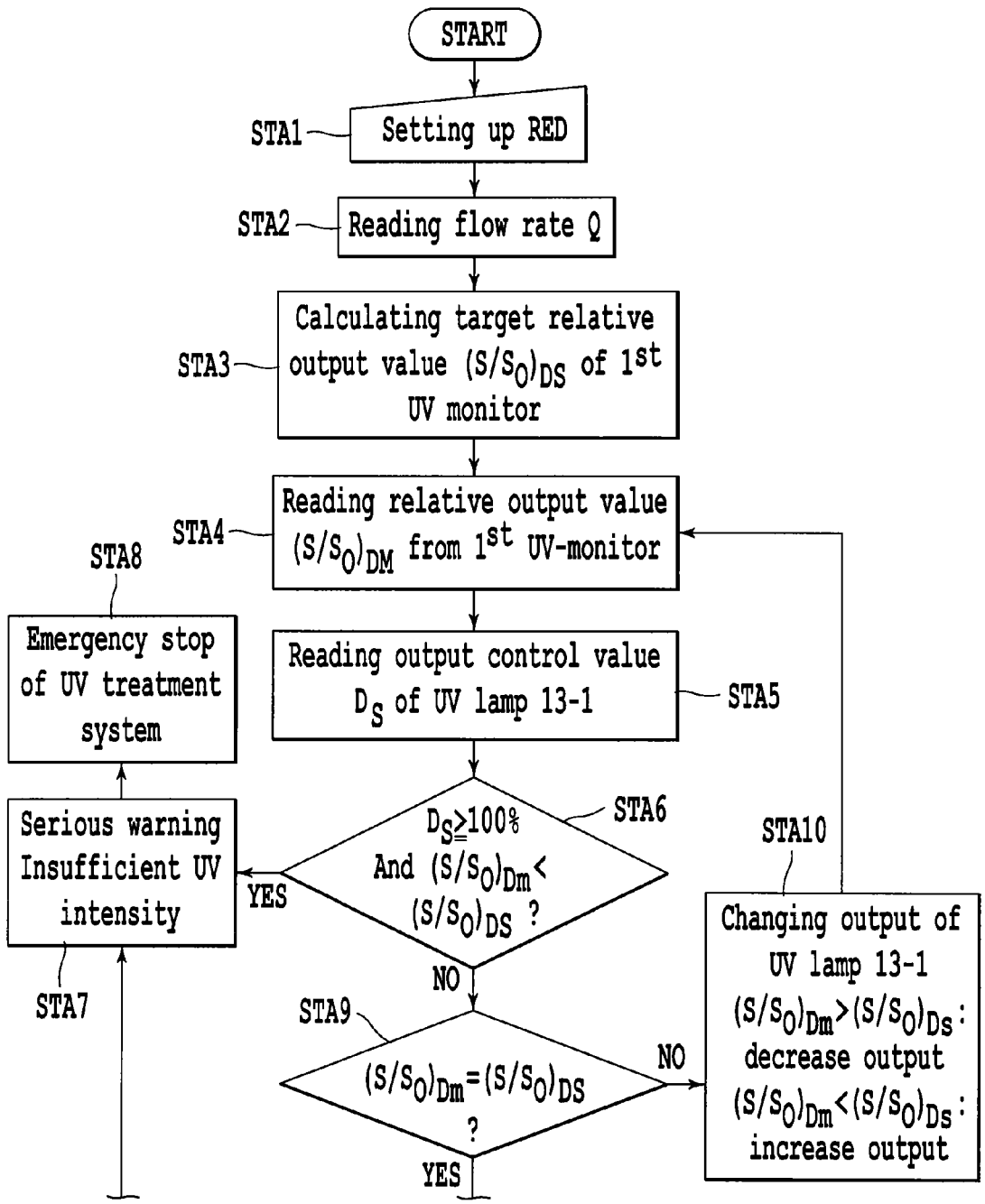
FIGS. 12A-12B in combination provide an exemplary flowchart showing a series of processes to monitor the ultraviolet irradiation apparatus and to control the outputs of the ultraviolet lamps according to the embodiment 1.
Figure 12B:
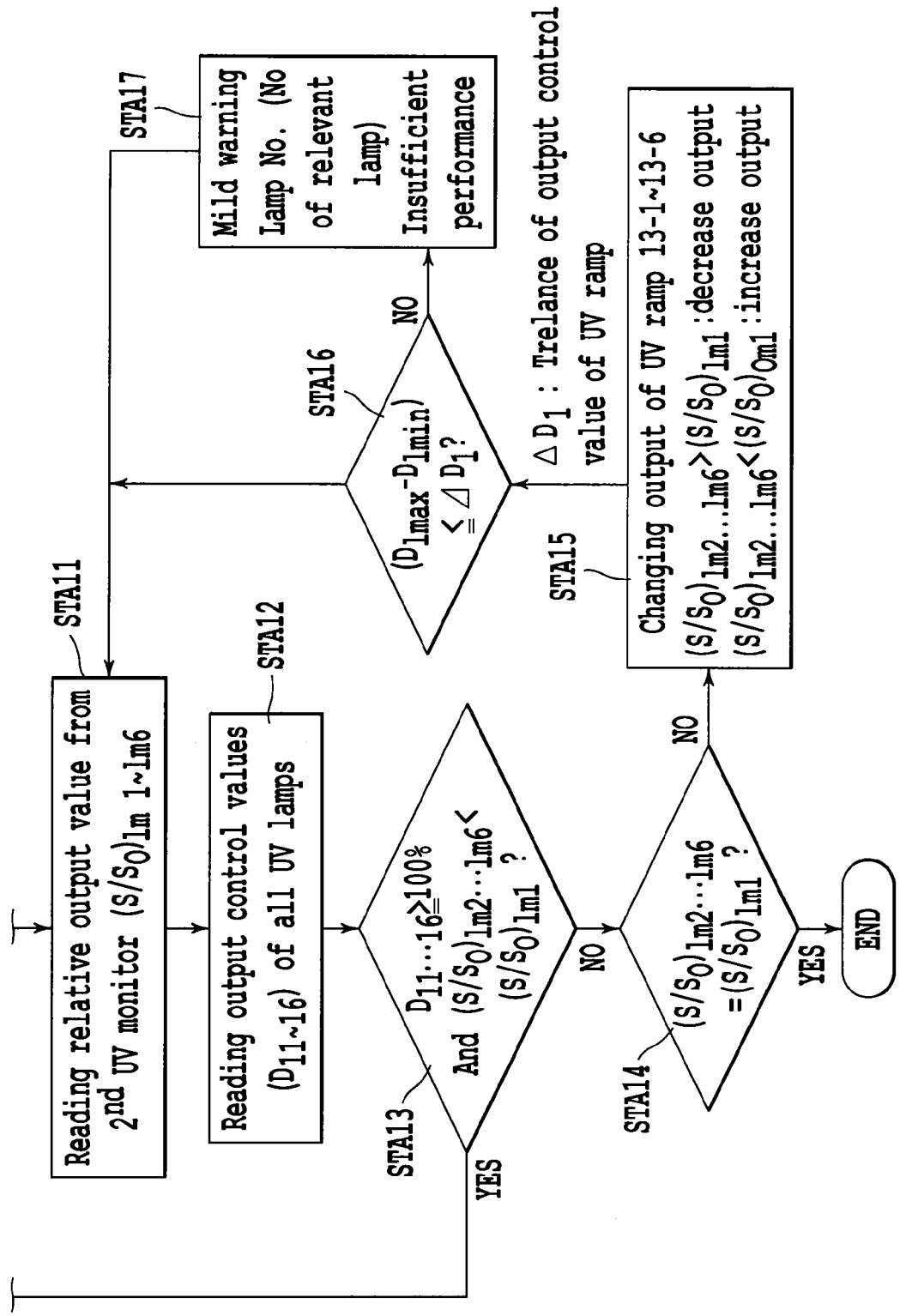

FIGS. 12A-12B in combination provide an exemplary flowchart showing a case where the monitoring and the ultraviolet-lamp output control in the ultraviolet-treatment system 1 are performed according to the embodiment 1. The monitoring and the control according to the embodiment 1 are described below.

Firstly, at the beginning of the monitoring and the control, a target ultraviolet dose (target RED) is set (Step STA1). Subsequently, the ultraviolet-dose monitoring and controlling apparatus 6 acquires the output (flow rate Q) of the flowmeter 3 (Step STA2).

Subsequently, the ultraviolet-dose monitoring and controlling apparatus 6 assigns the target RED and the flow rate Q to the formula (2), and thereby calculates a target relative output value $(S/S_0)_{DS}$ of the first ultraviolet-irradiation monitor 21 (Step STA3).

Subsequently, the ultraviolet-dose monitoring and controlling apparatus 6 acquires the relative output $(S/S_0)_{Dm}$ from the first ultraviolet-irradiation monitor 21 (Step STA4), and also acquires the output control value (Ds) of the ultraviolet lamp 13-1, which is the monitoring target of the first ultraviolet-irradiation monitor 21 (Step STA5).

Subsequently, the ultraviolet-dose monitoring and controlling apparatus 6 judges whether the output control value (Ds) of the ultraviolet lamp 13-1 is equal to or higher than 100% (Ds≧100%). In addition, the ultraviolet-dose monitoring and controlling apparatus 6 judges whether the relative output $(S/S_0)_{Dm}$ of the first ultraviolet-irradiation monitor 21 is smaller than the target relative output value $(S/S_0)_{DS}$ $((S/S_0)_{Dm}<(S/S_0)_{DS})$ (Step STA6).

If the output control value (Ds) is equal to or higher than 100% (Ds≧100%) and the relative output $(S/S_0)_{Dm}$ is smaller than the target relative output value $(S/S_0)_{DS}((S/S_0)_{Dm}<(S/S_0)_{DS})$, the ultraviolet-dose monitoring and controlling apparatus 6 sends a serious warning message "Insufficient ultraviolet intensity" to the ultraviolet-treatment-facility monitoring and controlling apparatus 7 (Step STA7), and stops the operation of the ultraviolet-treatment system 1 (Step STA8).

If the output control value (Ds) is smaller than 100% (Ds<100%) or the relative output $(S/S_0)_{Dm}$ is equal to or higher than the target relative output value $(S/S_0)_{DS}$ $((S/S_0)_{Dm}≧(S/S_0)_{DS})$, the ultraviolet-dose monitoring and controlling apparatus 6 judges whether the relative output $(S/S_0)_{Dm}$ of the first ultraviolet-irradiation monitor 21 is equal to the target relative output value $(S/S_0)_{DS}((S/S_0)_{Dm}=(S/S_0)_{DS})$ (Step STA9).

If the relative output $(S/S_0)_{Dm}$ is not equal to the target relative output value $(S/S_0)_{DS}$, the ultraviolet-dose monitoring and controlling apparatus 6 controls the electric power output of the lamp power source 5, and thereby adjusts the lamp output of the ultraviolet lamp 13-1 in accordance with the following conditions (Step STA10).

If $(S/S_0)_{Dm}>(S/S_0)_{DS}$, the ultraviolet-dose monitoring and controlling apparatus 6 decreases the output control value of the ultraviolet lamps 13-1. If $(S/S_0)_{Dm}<(S/S_0)_{DS}$, the ultraviolet-dose monitoring and controlling apparatus 6 increases the output control value of the ultraviolet lamp 13-1.

After adjusting the lamp output of the ultraviolet lamp 13-1 in the above-described way, the ultraviolet-dose monitoring and controlling apparatus 6 repeats the processes at Steps STA4, STA5, STA6, and STA9 until the relative output $(S/S_0)_{Dm}$ becomes equal to the target relative output value $(S/S_0)_{DS}$.

After the relative output $(S/S_0)_{Dm}$ becomes equal to the target relative output value $(S/S_0)_{DS}$, the ultraviolet-dose monitoring and controlling apparatus 6 acquires the relative outputs $((S/S_0)_{lm1\ to\ lm6})$ of the second ultraviolet-irradiation monitors 24-1 to 24-6 (Step STA11). Note that the second ultraviolet-irradiation monitors 24-1 monitors the ultraviolet lamp 13-1, which is also the monitoring target of the first ultraviolet-irradiation monitor 21. The second ultraviolet-irradiation monitors 24-1 serves as a reference monitor for the other second ultraviolet-irradiation monitors 24-2 to 24-6.

Subsequently, the ultraviolet-dose monitoring and controlling apparatus 6 acquires, from the lamp power source 5, all the ultraviolet lamp output control values $(D_{l1\ to\ l6})$ (Step STA12). The ultraviolet-dose monitoring and controlling apparatus 6 judges whether any of the output control values (D11 to D16) of the ultraviolet lamps 13-1 to 13-6 is equal to or higher than 100% ($D_{l1}$ to $D_{l6}$≧100%). In addition, the ultraviolet-dose monitoring and controlling apparatus 6 judges whether the relative output $(S/S_0)_{lmi}$ of each second ultraviolet-irradiation monitor 24 that monitors the ultraviolet lamp 13 with the output control value Di, being equal to or higher than 100% is smaller than the relative output $(S/S_0)_{lm1}$ of the second ultraviolet-irradiation monitors 24-1 $((S/S_0)_{lm2\ to\ lm6}<(S/S_0)_{lm1})$ (Step STA13).

If any of the output control values $(D_{l1}$ to $D_{l6})$ is equal to or higher than 100%, and the relative output $(S/S_0)_{lmi}$ of each second ultraviolet-irradiation monitor 24-i that monitors the ultraviolet lamp 13 with the output control value $D_{li}$ being equal to or higher than 100% is smaller than the relative output $(S/S_0)_{lm1}$ of the second ultraviolet-irradiation monitor 24-1, the ultraviolet-dose monitoring and controlling apparatus 6 sends a serious warning message "Insufficient ultraviolet intensity" to the ultraviolet-treatment-facility monitoring and controlling apparatus 7 (Step STA7), and stops the operation of the ultraviolet-treatment system 1 (Step STA8).

If any of the output control values $(D_{l1}$ to $D_{l6})$ is smaller than 100%, or the relative output $(S/S_0)_{lmi}$ of each second ultraviolet-irradiation monitor 24-i that monitors the ultraviolet lamp 13 with the output control value $D_{li}$ being equal to or higher than 100% is equal to or higher than the relative output $(S/S_0)_{lm1}$ of the second ultraviolet-irradiation monitor 24-1, the ultraviolet-dose monitoring and controlling apparatus 6 judges whether the relative output $(S/S_0)_{lm1}$ of the second ultraviolet-irradiation monitor 24-1 configured to monitor the ultraviolet lamp 13-1, which is the monitoring target of the first ultraviolet-irradiation monitor 21, is equal to each of the relative outputs $(S/S_0)_{lm2\ to\ lm6}$ of the other second ultraviolet-irradiation monitors 24-2 to 24-6 $((S/S_0)_{lm1}=(S/S_0)_{lm2\ to\ lm6})$ (Step STA14).

If the relative output $(S/S_0)_{lm1}$ is not equal to each of the relative outputs $(S/S_0)_{lm2\ to\ lm6})$, the ultraviolet-dose monitoring and controlling apparatus 6 adjusts the lamp outputs of the ultraviolet lamps 13-2 to 13-6 in accordance with the following conditions (Step STA15).

If $(S/S_0)_{lm2\ to\ lm6}>(S/S_0)_{lm1}$, the ultraviolet-dose monitoring and controlling apparatus 6 decreases the output control value of each ultraviolet lamp that satisfies the condition. If $(S/S_0)_{lm2\ to\ lm6}<(S/S_0)_{lm1}$, the ultraviolet-dose monitoring and controlling apparatus 6 increases the output control value of each ultraviolet lamp that satisfies the condition.

Subsequently, the ultraviolet-dose monitoring and controlling apparatus 6 judges whether the difference between the largest value $(D_{lmax})$ of the output control values and the smallest value $(D_{lmin})$ of the output control values of each of the ultraviolet lamps 13 equal to or lower than a tolerable difference $\Delta D_l$ (i.e., $D_{lmax}-D_{lmin}≦\Delta D_l$) (Step STA16). Note that a standard value of the ultraviolet intensity is determined beforehand, the largest output control value $D_{lmax}$ is an output control value that makes the output 100% of the standard value, and the smallest output control value $D_{lmin}$ is an output control value that makes the output 50% of the standard value.

If the difference between the largest output control value $D_{lmax}$ and the smallest output control value $D_{lmin}$ is larger than the tolerable difference $\Delta D_l$, the ultraviolet-dose monitoring and controlling apparatus 6 sends a mild warning message "Lamp No. (the number of the relevant lamp) insufficient performance" to the ultraviolet-treatment-facility monitoring and controlling apparatus 7 (Step STA17), and thus urges the user to replace the ultraviolet lamp with a new one.

If the difference between the largest output control value $D_{lmax}$ and the smallest output control value $D_{lmin}$ equal to or smaller than the tolerable difference $\Delta D1$, the ultraviolet-dose monitoring and controlling apparatus 6 repeats the processes at Steps STA11, STA12, STA13, and STA14 until each of the relative output $(S/S_0)_{lm2\ to\ lm6}$ becomes equal to the relative output $(S/S_0)_{lm1}$.

Once each of the relative output $(S/S_0)_{lm2\ to\ lm6}$ becomes equal to the relative output $(S/S_0)_{lm1}$, the ultraviolet-dose monitoring and controlling apparatus 6 finishes the operations of monitoring the ultraviolet doses of the ultraviolet lamps 13 and of controlling the outputs of the ultraviolet lamps 13.

According to the embodiment 1 the embodiment 1, the ultraviolet dose in the ultraviolet irradiation apparatus 2 can be constantly monitored, and the ultraviolet dose can be controlled. If the flow rate is smaller than the planned flow rate or if the water to be treated has an ultraviolet transmissivity that is higher than the one specified in the design conditions, an excess ultraviolet dose sometimes takes place. In such cases, the ultraviolet-dose monitoring and controlling apparatus 6 can operate the ultraviolet irradiation apparatus 2 with the output of the ultraviolet lamps 13 decreased. Accordingly, wasteful electric power consumption to drive the ultraviolet lamps can be avoided, and thereby energy saving can be achieved.

In contrast, if the flow rate is larger than the planned flow rate or if the water to be treated has an ultraviolet transmissivity that is lower than the one specified in the design conditions, an insufficient ultraviolet dose sometimes takes place. An insufficient ultraviolet dose allows pathogenic microorganisms to survive in the water treated by the ultraviolet-treatment system 1, and, as a consequence, may possibly result in the spread of infectious diseases that are caused by the surviving pathogenic microorganisms. The ultraviolet-dose monitoring and controlling apparatus 6, however, can prevent such an insufficient ultraviolet dose from occurring. Hence, according to the ultraviolet-treatment system 1 of this embodiment, the reliability of the ultraviolet irradiation apparatus can be improved and safer water can be supplied.

In addition, according to the ultraviolet-treatment system 1 of this embodiment, it is possible to monitor and control, individually, the ultraviolet-ray emission performances of the ultraviolet lamps disposed in the ultraviolet irradiation apparatus 2. Hence, ultraviolet intensities of all the ultraviolet lamps in the ultraviolet irradiation apparatus 2 can be uniformized. Accordingly, it is possible to run stably the ultraviolet irradiation apparatus 2, and it is also possible to identify the ultraviolet lamp with unsatisfactory performance. As a consequence, it is possible to prevent the spread of infectious diseases caused by the pathogenic microorganisms that survive in the water treated by the ultraviolet-treatment system 1. Hence, according to this embodiment, the reliability of the ultraviolet irradiation apparatus can be improved and safer water can be supplied.

Embodiment 2

Next, an ultraviolet irradiation system according to an embodiment 2 will be described by referring to the drawings. Portions same as those in the ultraviolet irradiation system according to the embodiment 1 are denoted by the same reference numerals and the description thereof will be omitted.

Figure 13:
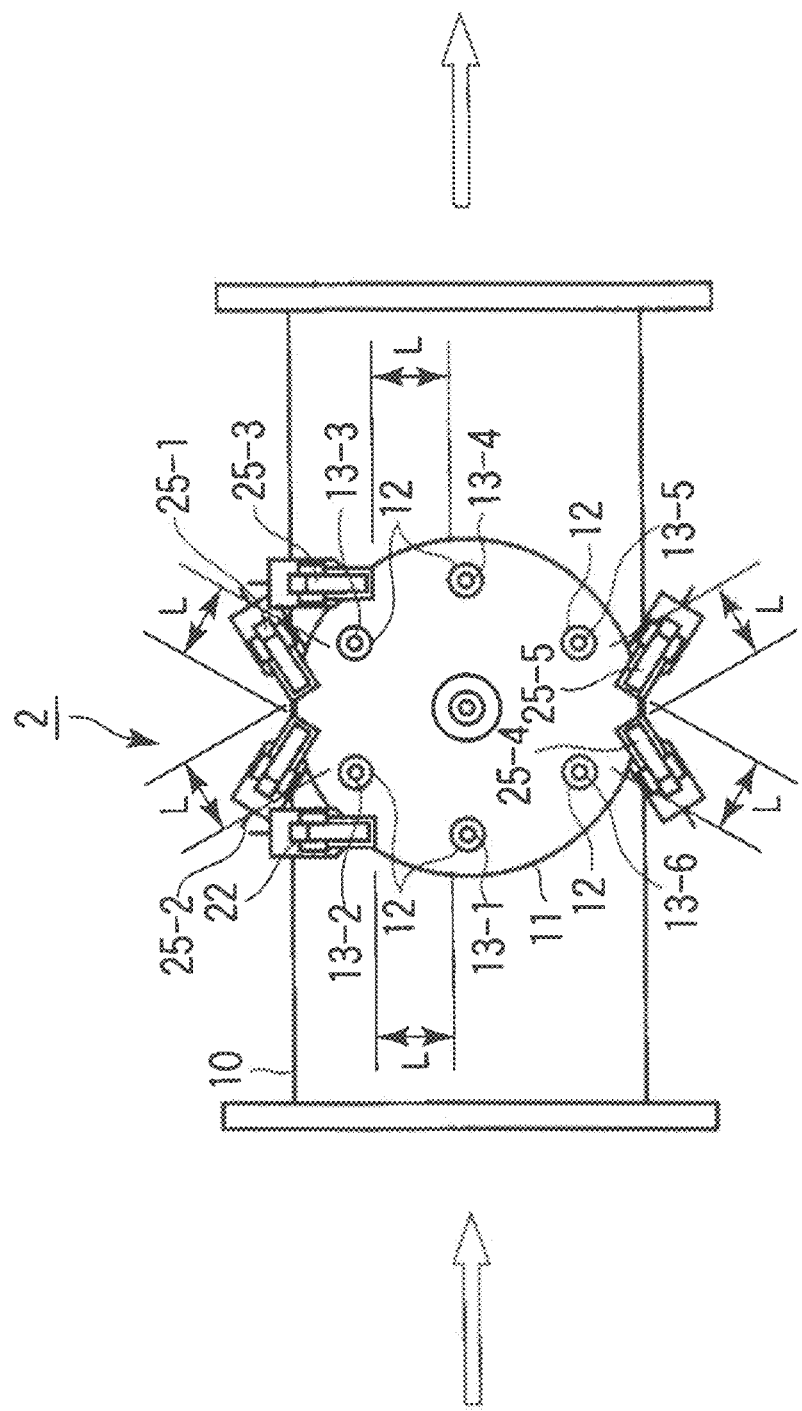
FIG. 13 exemplary shows a configuration of an ultraviolet irradiation apparatus according to an embodiment 2.

FIG. 13 exemplary shows a configuration of an ultraviolet irradiation apparatus provided in the ultraviolet irradiation system according to the embodiment 2. In the ultraviolet irradiation apparatus of this embodiment, devices each of which has the same specifications as those of the first measurement head 22 are used as the second measurement heads 25-1 to 25-5. The second measurement heads 25-1 to 25-5 are disposed in such a manner that the extended line of the central axis of each of the second measurement heads 25-1 to 25-5 intersects the substantially central axis of the corresponding one of the ultraviolet lamps 13-2 to 13-6 as the measurement target for the second measurement head 25. In the ultraviolet irradiation apparatus of this embodiment, devices each of which has the same specifications as those of the first ultraviolet-irradiation monitor 21 are used as the second ultraviolet-irradiation monitors 24.

The same distance L is secured between the measurement-window surfaces 31 of the measurement windows 30 incorporating the first measurement head 22 and the second measurement heads 25-1 to 25-5 and the outer circumferential surfaces of the protection pipes 12 for the ultraviolet lamps 13-1 to 13-6 as the respective measurement targets of the measurement heads. Preferably the measurement windows 30 and the protection pipes 12 are disposed in such a manner that the distance L is approximately 135 mm. All the constituent portions of the configuration other than the ones described above are identical to their respective counterparts of the ultraviolet irradiation system according to the embodiment 1.

In the ultraviolet irradiation apparatus 2 with the above-described configuration, the first ultraviolet-irradiation monitor 21 serves as a reference monitor for the second ultraviolet-irradiation monitors 24.

Figure 14A:
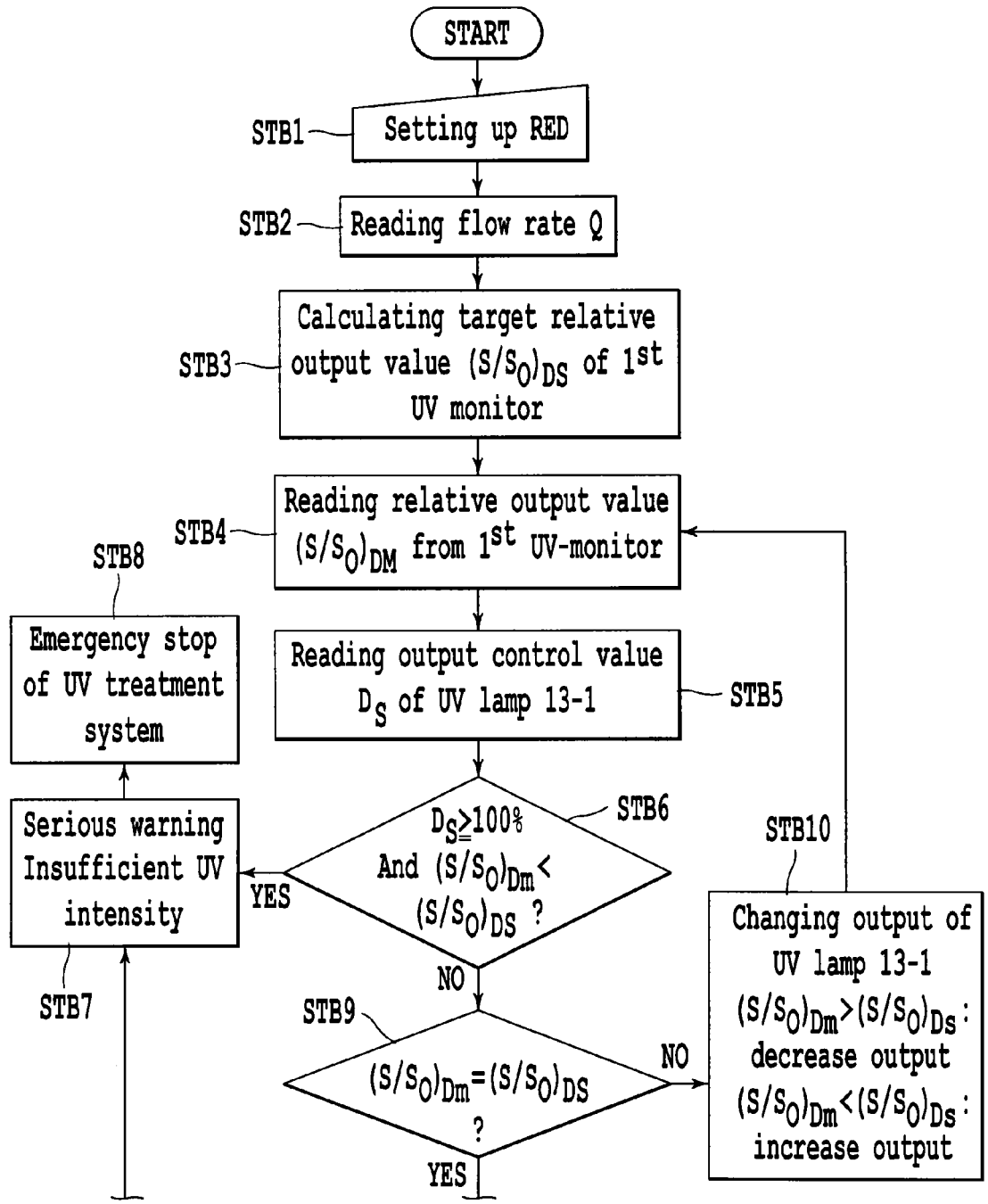
FIGS. 14A-14B in combination provide an exemplary flowchart showing a series of processes to monitor the ultraviolet irradiation apparatus and to control the outputs of the ultraviolet lamps according to the embodiment 2.
Figure 14B:
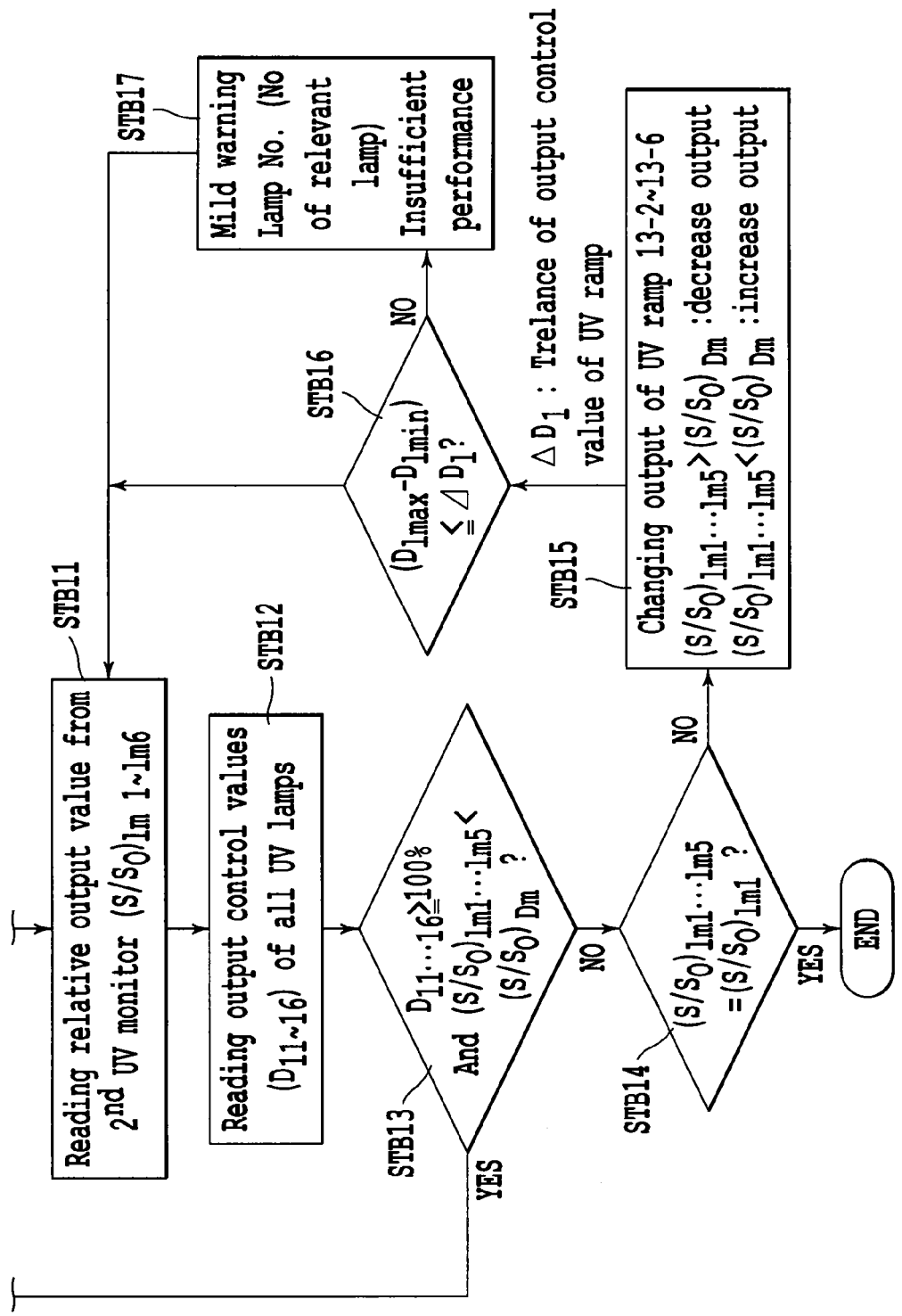

FIGS. 14A-14B in combination provide a flowchart illustrating a series of processes to monitor the ultraviolet-treatment system 1 and to control the outputs of the ultraviolet lamps according to the embodiment 2. Description is given below of the monitoring and the control performed in the embodiment 2.

Firstly, at the beginning of the monitoring and the control, a target ultraviolet dose (target RED) is set (Step STB1). Subsequently, the ultraviolet-dose monitoring and controlling apparatus 6 acquires output (flow rate Q) of the flowmeter 3 (Step STB2).

Subsequently, the ultraviolet-dose monitoring and controlling apparatus 6 assigns the target RED and the flow rate Q to the formula (2), and thereby calculates a target relative output value $(S/S_0)_{DS}$ of the first ultraviolet-irradiation monitor 21 (Step STB3).

Subsequently, the ultraviolet-dose monitoring and controlling apparatus 6 acquires the relative output $(S/S_0)_{Dm}$ from the first ultraviolet-irradiation monitor 21 (Step STB4), and also acquires the output control value (Ds) of the ultraviolet lamp 13-1, which is the monitoring target of the first ultraviolet-irradiation monitor 21 (Step STB5).

Subsequently, the ultraviolet-dose monitoring and controlling apparatus 6 judges whether the output control value (Ds) is equal to or higher than 100% (Ds≧100%). In addition, the ultraviolet-dose monitoring and controlling apparatus 6 judges whether the relative output $(S/S_0)_{Dm}$ of the first ultraviolet-irradiation monitor 21 is smaller than the target relative output value $(S/S_0)_{DS}$ ($(S/S_0)_{Dm} < (S/S_0)_{DS}$) (Step STB6).

If the output control value (Ds) is equal to or higher than 100% (Ds≧100%) and the relative output $(S/S_0)_{Dm}$ is smaller than the target relative output value $(S/S_0)_{DS}$ ($(S/S_0)_{Dm} < (S/S_0)_{DS}$), the ultraviolet-dose monitoring and controlling apparatus 6 sends a serious warning message "Insufficient ultraviolet intensity" to the ultraviolet-treatment-facility monitoring and controlling apparatus 7 (Step STB7), and stops the operation of the ultraviolet-treatment system 1 (Step STB8).

If the output control value (Ds) is smaller than 100% (Ds<100%) or the relative output $(S/S_0)_{Dm}$ is equal to or higher than the target relative output value $(S/S_0)_{DS}$ ($(S/S_0)_{Dm} \geq (S/S_0)_{DS}$), the ultraviolet-dose monitoring and controlling apparatus 6 judges whether the relative output $(S/S_0)_{Dm}$ of the first ultraviolet-irradiation monitor 21 is equal to the target relative output value $(S/S_0)_{DS}$ ($(S/S_0)_{Dm} = (S/S_0)_{DS}$) (Step STB9).

If the relative output $(S/S_0)_{Dm}$ is not equal to the target relative output value $(S/S_0)_{DS}$, the ultraviolet-dose monitoring and controlling apparatus 6 controls the electric power output of the lamp power source 5, and thereby adjusts the lamp output of the ultraviolet lamp 13-1 in accordance with the following conditions (Step STB10).

If $(S/S_0)_{Dm} > (S/S_0)_{DS}$, the ultraviolet-dose monitoring and controlling apparatus 6 decreases the output control value of the ultraviolet lamps 13-1. If $(S/S_0)_{Dm} < (S/S_0)_{DS}$, the ultraviolet-dose monitoring and controlling apparatus 6 increases the output control value of the ultraviolet lamp 13-1.

After adjusting the lamp output of the ultraviolet lamp 13-1 in the above-described way, the ultraviolet-dose monitoring and controlling apparatus 6 repeats the processes at Steps STB4, STB5, STB6, and STB 9 until the relative output $(S/S_0)_{Dm}$ becomes equal to the target relative output value $(S/S_0)_{DS}$.

Subsequently, after the relative output $(S/S_0)_{Dm}$ becomes equal to the target relative output value $(S/S_0)_{DS}$, the ultraviolet-dose monitoring and controlling apparatus 6 acquires the relative outputs $((S/S_0)_{lm1\ to\ lm5})$ of the second ultraviolet-irradiation monitors 24-1 to 24-5 (Step STB11). In addition, the ultraviolet-dose monitoring and controlling apparatus 6 acquires the ultraviolet lamp output control values $(D_{l1\ to\ l6})$ of all the ultraviolet lamps 13 (Step STB12).

Subsequently, the ultraviolet-dose monitoring and controlling apparatus 6 judges whether any of the output control values $(D_{l1}$ to $D_{l6})$ is equal to or higher than 100% $(D_{l1}$ to $D_{l6} > 100\%)$. In addition, the ultraviolet-dose monitoring and controlling apparatus 6 judges whether the relative output $(S/S_0)_{lmi}$ of each second ultraviolet-irradiation monitor 24 that monitors the ultraviolet lamp 13-$i$ with the output control value $D_{li}$ being equal to or higher than 100% is smaller than the relative output $(S/S_0)_{Dm}$ of the first ultraviolet-irradiation monitor 21 $((S/S_0)_{lm1\ to\ lm5} < (S/S_0)_{Dm})$ (Step STB13).

If any of the output control values $(D_{li})$ is equal to or higher than 100%, and the relative output $(S/S_0)_{lmi}$ is smaller than the relative output $(S/S_0)_{Dm}$ of the first ultraviolet-irradiation monitor 21, the ultraviolet-dose monitoring and controlling apparatus 6 sends a serious warning message "Insufficient ultraviolet intensity" to the ultraviolet-treatment-facility monitoring and controlling apparatus 7 (Step STB7), and stops the operation of the ultraviolet-treatment system 1 (Step STB8).

If any of the output control values $(D_{l1}$ to $D_{l6})$ is smaller than 100%, or the relative output $(S/S_0)_{lmi}$ is equal to or higher than the relative output $(S/S_0)_{Dm}$ of the first ultraviolet-irradiation monitor 21, the ultraviolet-dose monitoring and controlling apparatus 6 judges whether the relative output $(S/S_0)_{Dm}$ of the first ultraviolet-irradiation monitor 21 is equal to each of the relative outputs $(S/S_0)_{lm1\ to\ lm5}$ of the second ultraviolet-irradiation monitors 24-1 to 24-5 $((S/S_0)_{Dm} = (S/S_0)_{lm1\ to\ lm5})$ (Step STB14). If each of the relative output $(S/S_0)_{lm1\ to\ lm5}$ is equal to, the relative output $(S/S_0)_{Dm}$ the ultraviolet-dose monitoring and controlling apparatus 6 finishes the operations of monitoring the ultraviolet dose and of controlling the outputs of the ultraviolet lamps 13.

If each of the relative outputs $(S/S_0)_{lm1\ to\ lm5}$ is not equal to the relative output $(S/S_0)_{Dm}$, the ultraviolet-dose monitoring and controlling apparatus 6 adjusts the lamp outputs of the ultraviolet lamps 13-2 to 13-6 in accordance with the following conditions (Step STB15).

If $(S/S_0)_{lm1\ to\ lm5} > (S/S_0)_{Dm}$, the ultraviolet-dose monitoring and controlling apparatus 6 decreases the output control value of each ultraviolet lamp that satisfies the condition. If $(S/S_0)_{lm1\ to\ lm5} < (S/S_0)_{Dm}$, the ultraviolet-dose monitoring and controlling apparatus 6 increases the output control value of each ultraviolet lamp that satisfies the condition.

Subsequently, the ultraviolet-dose monitoring and controlling apparatus 6 judges whether the difference between the largest value $(D_{lmax})$ and the smallest value $(D_{lmin})$ of the output control values of each of the ultraviolet lamps 13 is equal to or smaller than a tolerable difference $\Delta D_l$ (Step STA16). If the difference between the largest output control value $D_{lmax}$ and the smallest output control value $D_{lmin}$ is larger than the tolerable difference $\Delta D_l$, the ultraviolet-dose monitoring and controlling apparatus 6 sends a mild warning message "Lamp No. (the number of the relevant lamp) insufficient performance" to the ultraviolet-treatment-facility monitoring and controlling apparatus 7 (Step STA17), and thus urges the user to replace the ultraviolet lamp with a new one.

If the difference between the largest output control value $D_{lmax}$ and the smallest output control value $D_{lmin}$ is equal to or smaller than the tolerable difference $\Delta D_l$, after the relative output $(S/S_0)_{Dm}$ becomes equal to the target relative output value $(S/S_0)_{DS}$, the ultraviolet-dose monitoring and controlling apparatus 6 repeats the processes at Steps STB11, STB12, STB13, and STB14 until each of the relative output $(S/S_0)_{lm1\ to\ lm5}$ becomes equal to the relative output $(S/S_0)_{Dm}$.

In this embodiment, similar effects to those obtained by the ultraviolet irradiation apparatus 2 of the embodiment 1 described above can be obtained. In this embodiment, compared to the ultraviolet irradiation apparatus 2 of the embodiment 1, the first ultraviolet-irradiation monitor 21 can also serve as the second ultraviolet-irradiation monitors 24. Hence, the ultraviolet irradiation apparatus of this embodiment 2 can reduce the number of ultraviolet-irradiation monitors, measurement heads, protection pipes for the measurement heads, and related components compared with the ultraviolet irradiation apparatus of the embodiment 1.

In addition, the ultraviolet irradiation apparatus 2 of the embodiment 2 requires no protection pipes 23 used to install the second measurement heads 25. Hence, the flow of the water to be treated is less affected in the ultraviolet irradiation apparatus 2. In addition, the ultraviolet irradiation apparatus 2 of this embodiment 2 forms no such shadow areas that would otherwise be formed by the measurement-head protection pipes 23, a larger effective ultraviolet-irradiated area inside of the ultraviolet irradiation apparatus 2 can be obtained.

In addition, in the ultraviolet irradiation apparatus 2 of the embodiment 2, each of the second ultraviolet-irradiation monitors 24-1 to 24-5 is a device with the same specifications as those of the first ultraviolet-irradiation monitor 21, and each of the second measurement heads 25-1 to 25-5 is a device with the same specifications as those of the first measurement head 22. Accordingly, any of the ultraviolet-irradiation monitors can be used as the first ultraviolet-irradiation monitor 21 and the reference monitor for the second ultraviolet-irradiation monitors 24.

For example, suppose a case where the ultraviolet irradiation apparatus is provided with twice as many ultraviolet lamps 13-1 to 13-6 as necessary. The ultraviolet irradiation apparatus is configured in such a manner that a set of half of those ultraviolet lamps is used as the always-ON lamp set, and the lit lamp set can be switched between the two ultraviolet-lamp sets. If the performance of the currently lit ultraviolet-lamp set becomes poorer than the tolerable performance (designed performance), or if the accumulated time for which one of the ultraviolet-lamp set is lit reaches the expected service life, the lit lamp set is switched from one ultraviolet-lamp set to the other. In this case, similar monitoring and control to those before the switching of the lit ultraviolet-lamp set can be executed only by changing the ultraviolet-irradiation monitor that is used as the first ultraviolet-irradiation monitor 21.

Embodiment 3

Next, an ultraviolet irradiation system according to an embodiment 3 will be described by referring to the drawings.

The structure of the ultraviolet irradiation apparatus and the way of providing ultraviolet-irradiation monitors in the ultraviolet irradiation system of this embodiment 3 are similar to the ones in the embodiment 2. The way of monitoring the ultraviolet dose and the way of controlling the ultraviolet-lamp output differentiate this embodiment 3 from both the embodiment 1 and the embodiment 2.

The ultraviolet-dose monitoring and controlling apparatus 6 of this embodiment 3 uses a target relative output value calculated by assigning both a target ultraviolet dose and a flow rate of the water to be treated to a formula to calculate a value of the ultraviolet-irradiation monitor's relative output that is necessary to achieve a target ultraviolet dose. In addition, among all the ultraviolet-irradiation monitors each of which is configured to monitor one of the plural ultraviolet lamps, the ultraviolet-irradiation monitor with the smallest relative output value is used as the reference ultraviolet-irradiation monitor at that time.

In addition, the ultraviolet-dose monitoring and controlling apparatus 6 adjust the output of the ultraviolet lamp monitored by the reference ultraviolet-irradiation monitor so that the relative output value of the reference ultraviolet-irradiation monitor at that time can be equal to the target relative output value. Then, the ultraviolet-dose monitoring and controlling apparatus 6 sets the output control values of the other ultraviolet lamps at the same output control value as that of the ultraviolet lamp monitored by the reference ultraviolet-irradiation monitor.

Figure 15:
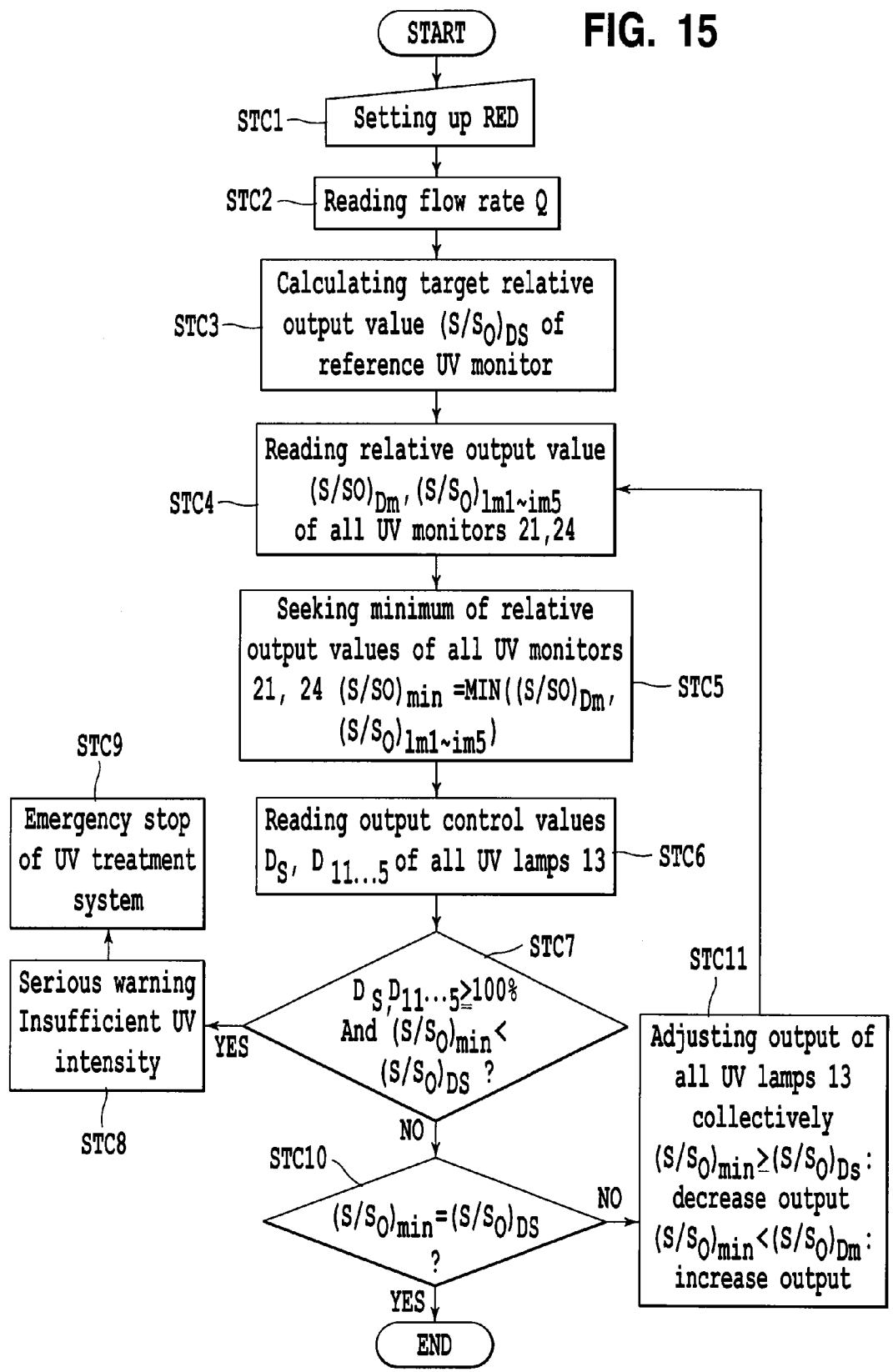
FIG. 15 is a flowchart exemplary showing a series of processes to monitor the ultraviolet irradiation apparatus and to control the outputs of the ultraviolet lamps according to an embodiment 3.

FIG. 15 is a flowchart exemplary showing the monitoring of the ultraviolet-treatment system and control of the output of the ultraviolet lamps according to this third embodiment 3. The monitoring and control according to this embodiment 3 will be exemplary described below by referring to FIG. 15.

Firstly, at the beginning of the monitoring and the control, a target ultraviolet dose (target RED) is set (Step STC1). Subsequently, the ultraviolet-dose monitoring and controlling apparatus 6 acquires the output of the flow meter 3 (flow rate Q) (Step STC2).

Subsequently, the ultraviolet-dose monitoring and controlling apparatus 6 assigns the target RED and the flow rate Q to the formula (2), and thereby calculates a target relative output value $(S/S_0)_{DS}$ (Step STC3).

Subsequently, the ultraviolet-dose monitoring and controlling apparatus 6 acquires the relative output $(S/S_0)_{Dm}$ of the first ultraviolet-irradiation monitor 21 and the relative outputs $(S/S_0)_{lm1\ to\ lm5}$ of second ultraviolet-irradiation monitors 24 (Step STC4).

Subsequently, the ultraviolet-dose monitoring and controlling apparatus 6 identifies the smallest relative output $(S/S_0)_{min}$ among the relative outputs $(S/S_0)_{Dm}$ and $(S/S_0)_{lm1\ to\ lm5}$ (Step STC5).

$$(S/S_0)_{min} = \mathrm{MIN}(((S/S_0)_{Dm}, (S/S_0)_{lm1\ to\ lm5})$$

Subsequently, the ultraviolet-dose monitoring and controlling apparatus 6 acquires, from the lamp power source 5, all the ultraviolet-lamp output control values $(D_S, D_{l1\ to\ l5})$ (Step STC6).

Subsequently, the ultraviolet-dose monitoring and controlling apparatus 6 judges whether all the output control values $(D_S, D_{l1\ to\ l5})$ of the ultraviolet lamps 13-1 to 13-6 are equal to or higher than 100%, and whether the smallest relative output $(S/S_0)_{min}$ is smaller than the target relative output value $(S/S_0)_{DS}$ (Step STC7).

If all the output control values $(Ds, D_{l1\ to\ l5})$ are equal to or higher than 100% and the smallest relative output $(S/S_0)_{min}$ is smaller than the target relative output value $(S/S_0)_{DS}$, the ultraviolet-dose monitoring and controlling apparatus 6 sends a serious warning message "Insufficient ultraviolet intensity" to the ultraviolet-treatment-facility monitoring and controlling apparatus 7 (Step STC8), and stops the operations of the ultraviolet-treatment system (Step STC9).

If any of the output control values $(D_S, D_{l1\ to\ l5})$ is smaller than 100%, or if the smallest relative output $(S/S_0)_{min}$ is equal to or higher than the target relative output value $(S/S_0)_{DS}$, the ultraviolet-dose monitoring and controlling apparatus 6 judges whether the smallest relative output $(S/S_0)_{min}$ is equal to the target relative output value $(S/S_0)_{DS}$ (Step STC10).

If the smallest relative output $(S/S_0)_{min}$ is not equal to the target relative output value $(S/S_0)_{DS}$, the ultraviolet-dose monitoring and controlling apparatus 6 adjusts the outputs of all the ultraviolet lamps 13 in accordance with the following conditions (Step STC11).

If $(S/S_0)_{min} > (S/S_0)_{DS}$, the ultraviolet-dose monitoring and controlling apparatus 6 decreases the output control values of all the ultraviolet lamps 13-1 to 13-6. If $(S/S_0)_{min} < (S/S_0)_{DS}$, the ultraviolet-dose monitoring and controlling apparatus 6 increases the output control values of all the ultraviolet lamps 13-1 to 13-6.

After that, the ultraviolet-dose monitoring and controlling apparatus 6 repeats the processes at Steps STC4, STC5, STC6, STC7, and STC10 until the relative output $(S/S_0)_{min}$ becomes equal to the target relative output value $(S/S_0)_{DS}$.

If, at Step STC10, the smallest relative output $(S/S_0)_{min}$ is equal to the target relative output value $(S/S_0)_{DS}$, the ultraviolet-dose monitoring and controlling apparatus 6 finishes the monitoring of the ultraviolet dose and the control of the ultraviolet-lamp outputs.

According to the embodiment 3, similar effects to those obtainable in the embodiment 1 and the embodiment 2 can be obtained. In addition, the ultraviolet-treatment system can be always operated at sufficient performance because the outputs of all the ultraviolet lamps are controlled in such a manner that the smallest one of the values measured by the ultraviolet-irradiation monitors is kept equal to or higher than the target ultraviolet intensity.

In addition, the monitoring of the ultraviolet dose and the control of the ultraviolet-lamp outputs can be made simpler because it is not necessary to individually control the ultraviolet lamps.

Note that in the embodiments 1, 2 and 3 described thus far, the ultraviolet-irradiation monitors output the relative output values. Alternatively, when the ultraviolet intensities of all the ultraviolet lamps are adjusted to be a single value, the absolute values of the ultraviolet intensities measured by the measurement heads may be used instead of the relative output values.

In addition, in the embodiments 1, 2 and 3, the ultraviolet lamps in the ultraviolet irradiation apparatus are arranged in a direction that is perpendicular to the flow of the fluid to be treated, but the structure of the ultraviolet irradiation apparatus is not limited to those above described. Even if the ultraviolet lamps are arranged in parallel to the flow of the fluid to be treated, similar effects to those obtainable in the embodiments 1, 2 and 3 can be obtained.

The ultraviolet irradiation system according to the embodiments a, 2 and 3 includes both the ultraviolet-irradiation monitor configured to always monitor the ultraviolet-irradiation state in the ultraviolet irradiation apparatus and a lamp-performance-monitoring ultraviolet-irradiation monitor configured to individually monitor the performances of the ultraviolet lamps provided as the light sources to emit ultraviolet rays in the ultraviolet irradiation apparatus. Hence, the performance of the ultraviolet irradiation apparatus can be monitored accurately, and either excess or insufficient ultraviolet dose can be avoided by controlling the outputs of the ultraviolet lamps on the basis of the monitoring results. So, according to the first to the embodiments 1, 2 and 3 a more reliable ultraviolet irradiation system can be provided. In addition, it is possible to provide an ultraviolet irradiation system capable of avoiding wasteful consumption of electric power and of performing an energy-saving operation.

In addition, the ultraviolet irradiation system according to the embodiment 1 includes not only the ultraviolet-irradiation monitor configured to monitor the ultraviolet dose in the ultraviolet irradiation apparatus but also the ultraviolet-irradiation monitor configured to monitor the performances of individual ultraviolet lamps. The ultraviolet irradiation system according to each of the embodiments 2 and 3 includes the ultraviolet-irradiation monitor configured not only to monitor the performances of individual ultraviolet lamps but also to monitor the ultraviolet dose in the ultraviolet irradiation apparatus. Hence, according to the f embodiments 1, 2 and 3, it is possible to provide an ultraviolet irradiation system capable of satisfying simultaneously both the demand for all-time monitoring and the demand for the monitoring of individual ultraviolet lamps.

Some embodiments of the invention have been described thus far, these embodiments are provided for illustrative purposes only and do not intend to restrict the scope of the invention. These novel embodiments can be carried out in various other forms. Various omissions, replacements, and modifications may be made without departing from the gist of the invention. These embodiments and their modifications are included in both the scope and the gist of the invention, and in the invention described in the claims and their equivalents.

For example, in a case where the number of ultraviolet lamps required for securing the ultraviolet dose that is required of the ultraviolet irradiation apparatus is determined, the ultraviolet irradiation apparatus may be provided with several times as many ultraviolet lamps as the necessary number. If the ultraviolet-ray emitting performance of a ultraviolet lamp becomes unsatisfactory, or if the service life of a ultraviolet lamp is about to expire, the ultraviolet irradiation apparatus may sequentially switch the currently-used ultraviolet lamps. In the ultraviolet irradiation apparatus of this type, the combination of the ultraviolet lamps to be lit is determined in advance so that the ultraviolet-ray emitting performance of the ultraviolet-lamp set after the switching is not significantly different from the ultraviolet-ray emitting performance of the ultraviolet-lamp set before the switching. Then, one representative ultraviolet lamp may be selected from each combination, and the first ultraviolet-irradiation monitor 21 and the first measurement head 22 may be provided to monitor the ultraviolet dose in the ultraviolet-treatment system and to monitor the representative ultraviolet lamp. Note that the representative ultraviolet lamp provides a reference used to control the outputs of all the ultraviolet lamps that are currently lit.

In this case, a target ultraviolet dose in the ultraviolet-treatment system may be set in advance, and a formula may be provided for each pre-set combination of ultraviolet lamps to calculate a target ultraviolet-irradiation-monitor relative-output value for different flow rates of the water to be treated by assigning a flow rate and the pre-set target ultraviolet dose.

Alternatively, a target ultraviolet dose in the ultraviolet-treatment system may be set in advance, and a formula may be provided in accordance with the characteristics of the combination of ultraviolet lamps with the smallest ultraviolet dose among the pre-set combinations of ultraviolet lamps to calculate a target ultraviolet-irradiation-monitor relative-output value for different flow rates of the water to be treated by assigning a flow rate and the pre-set target ultraviolet dose.

What is claimed is:

1. An ultraviolet irradiation system comprising:
an ultraviolet irradiation apparatus including a plurality of ultraviolet lamps, and configured to emit ultraviolet rays onto water to be treated let in the ultraviolet irradiation apparatus and to discharge the water to be treated after ultraviolet irradiation;
a flowmeter configured to measure a flow rate of the water to be treated that passes through the ultraviolet irradiation apparatus; and
an ultraviolet-dose monitoring and controlling apparatus configured to monitor an ultraviolet dose of the ultraviolet irradiation apparatus and to control outputs of the ultraviolet lamps, wherein
the plurality of ultraviolet lamps include a first ultraviolet lamp and a plurality of second ultraviolet lamps,
the ultraviolet irradiation apparatus includes:
a first measurement head configured to measure an ultraviolet intensity of the first ultraviolet lamp; and
a plurality of second measurement heads configured to respectively measure ultraviolet intensities of the plurality of second ultraviolet lamps, and
a distance between the first ultraviolet lamp and the first measurement head is determined to form a linear relationship between a reduction equivalent ultraviolet dose and a ratio of the ultraviolet intensity measured by the first measurement head to the ultraviolet intensity measured by the first measurement head when an output control value of the first ultraviolet lamp is 100%.

2. The ultraviolet irradiation system according to claim 1, wherein
the first measurement head includes a columnar-shaped first main body and a first photo-receiving surface provided, at an end of the first main body, to extend perpendicular to an axial direction of the first main body,
each of the second measurement heads includes a columnar-shaped second main body and a second photo-receiving surface provided along an axial direction of the second main body, and
a distance between each of the second measurement heads and the ultraviolet lamp whose ultraviolet intensity is measured by the second measurement head is equal to or smaller than the distance between the first measurement head and the first ultraviolet lamp.

3. The ultraviolet irradiation system according to claim 1, wherein
the plurality of ultraviolet lamps are disposed in a flow route of the water to be treated, and
the plurality of second measurement heads are disposed at substantially equal distances from their respective ultraviolet lamps whose ultraviolet intensities are measured by the second measurement heads.

4. The ultraviolet irradiation system according to claim 1, wherein
the ultraviolet irradiation apparatus includes:
a plurality of protection pipes each configured to cover an outer circumferential surface of the corresponding one of the plurality of ultraviolet lamps; and
a measurement window used to fix the first measurement head and to prevent contact of the first measurement head with the water to be treated, and
a distance between an external surface of the measurement window and an external surface of the protection pipe covering the outer circumferential surface of the first ultraviolet lamp is within a range from 130 mm to 140 mm.

5. The ultraviolet irradiation system according to claim 1 further comprising:
a first ultraviolet-irradiation monitor connected to the first measurement head and configured to output a relative output value of the first ultraviolet lamp based on measurement by the first measurement head; and
a plurality of second ultraviolet-irradiation monitors connected respectively to the plurality of second measurement heads, and each configured to output a relative output value of the ultraviolet lamp whose ultraviolet intensity is measured by the corresponding second measurement head, wherein
the ultraviolet-dose monitoring and controlling apparatus adjusts an output of the first ultraviolet lamp in such a manner that the relative output value of the first ultraviolet-irradiation monitor becomes equal to a pre-determined target relative output value,
the ultraviolet-dose monitoring and controlling apparatus adjusts an output of each of the plurality of second ultraviolet lamps in such a manner that the relative output value of the second ultraviolet lamp based on measurement by the corresponding second measurement head of the second ultraviolet-irradiation monitor becomes equal to a target value that is a relative output value of the first ultraviolet lamp based on measurement by the second measurement head,
the relative output value is a ratio of the ultraviolet intensity measured by a measurement head to the ultraviolet intensity measured by the measurement head when an output control value of the ultraviolet lamp is 100%.

6. An ultraviolet irradiation system comprising:
an ultraviolet irradiation apparatus including a plurality of ultraviolet lamps, and configured to emit ultraviolet rays onto water to be treated let in the ultraviolet irradiation apparatus and to discharge the water to be treated after ultraviolet irradiation;
a flowmeter configured to measure a flow rate of the water to be treated that passes through the ultraviolet irradiation apparatus; and
an ultraviolet-dose monitoring and controlling apparatus configured to monitor an ultraviolet dose of the ultraviolet irradiation apparatus and to control outputs of the ultraviolet lamps, wherein
the ultraviolet irradiation apparatus includes a plurality of measurement heads configured to respectively measure ultraviolet intensities of the plurality of ultraviolet lamps, and
each of the measurement heads and the corresponding one of the ultraviolet lamps are disposed to form a linear relationship between a reduction equivalent ultraviolet dose and a ratio of the ultraviolet intensity measured by the measurement head to the ultraviolet intensity measured by the measurement head when an output control value of the ultraviolet lamp is 100%.

7. The ultraviolet irradiation system according to claim 6, wherein
the plurality of ultraviolet lamps are disposed in a flow route of the water to be treated,
each of the measurement heads includes a columnar-shaped main body and a photo-receiving surface provided, at an end of the main body, to extend perpendicular to an axial direction of the main body, and
the plurality of measurement heads are at substantially equal distances from the respective ultraviolet lamps whose ultraviolet intensities are measured by the measurement heads.

8. The ultraviolet irradiation system according to claim 7, wherein
the ultraviolet irradiation apparatus includes:
a plurality of measurement windows used to fix the plurality of measurement heads and to prevent contact of the plurality of measurement heads with the water to be treated; and
a plurality of protection pipes each configured to cover an outer circumferential surface of the corresponding one of the plurality of ultraviolet lamps, and
a distance between an external surface of each of the measurement windows and an external surface of the protection pipe covering the outer circumferential surface of the corresponding ultraviolet lamp whose ultraviolet intensity is measured by the measurement head fixed to the measurement window is within a range from 130 mm to 140 mm.

9. The ultraviolet irradiation system according to claim 7 further comprising:
a plurality of ultraviolet-irradiation monitors connected respectively to the plurality of measurement heads, and each configured to output a relative output value of the corresponding ultraviolet lamp based on measurement by the corresponding measurement head, wherein
the ultraviolet-dose monitoring and controlling apparatus calculates a target relative output value from a pre-determined target ultraviolet dose and the flow rate of the water to be treated measured by the flowmeter, and
the ultraviolet-dose monitoring and controlling apparatus adjusts outputs of the plurality of ultraviolet lamps in such a manner that each of the relative output values of the plurality of ultraviolet-irradiation monitors becomes equal to the target relative output value.

10. The ultraviolet irradiation system according to claim 7 further comprising:
a plurality of ultraviolet-irradiation monitors connected respectively to the plurality of measurement heads, and each configured to output a relative output value of the corresponding ultraviolet lamp based on measurement by the corresponding measurement head, wherein
the ultraviolet-dose monitoring and controlling apparatus calculates a target relative output value from a pre-determined target ultraviolet dose and the flow rate of the water to be treated measured by the flowmeter,
the ultraviolet-dose monitoring and controlling apparatus defines, as the first ultraviolet-irradiation monitor, an ultraviolet-irradiation monitor having the smallest relative output value among the plurality of ultraviolet-irradiation monitors,
the ultraviolet-dose monitoring and controlling apparatus adjusts the output of the ultraviolet lamp whose ultraviolet intensity is measured by the measurement head connected to the first ultraviolet-irradiation monitor, in such a manner that the relative output value of the first ultraviolet-irradiation monitor becomes equal to the target relative output value, and all the outputs of the other ultraviolet lamps are set at an output control value substantially equal to the output control value of the ultraviolet lamp whose ultraviolet intensity is measured by the measurement head connected to the first ultraviolet-irradiation monitor.

* * * * *